(12) United States Patent
Williams et al.

(10) Patent No.: US 9,071,561 B2
(45) Date of Patent: *Jun. 30, 2015

(54) DOCUMENT OBJECT MODEL API FOR MIME

(71) Applicant: Microsoft Corporation, Redmond, WA (US)

(72) Inventors: Roy Williams, Woodinville, WA (US); Yuri Inglikov, Bellevue, WA (US); Oleg V. Ouliankine, Redmond, WA (US); Nelly Porter, Kirkland, WA (US); Loren Curtis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,004

(22) Filed: Aug. 21, 2013

(65) Prior Publication Data

US 2014/0052800 A1 Feb. 20, 2014

Related U.S. Application Data

(63) Continuation of application No. 13/526,790, filed on Jun. 19, 2012, now Pat. No. 8,549,088, which is a continuation of application No. 11/278,882, filed on Apr. 6, 2006, now Pat. No. 8,214,439.

(60) Provisional application No. 60/742,667, filed on Dec. 6, 2005.

(30) Foreign Application Priority Data

Dec. 6, 2006 (WO) ................ PCT/US2006/046819

(51) Int. Cl.
*H04L 12/58* (2006.01)
*G06Q 10/10* (2012.01)
(Continued)

(52) U.S. Cl.
CPC .............. *H04L 51/00* (2013.01); *G06Q 10/107* (2013.01); *H04L 12/585* (2013.01); *H04L 67/02* (2013.01); *H04L 69/22* (2013.01)

(58) Field of Classification Search
CPC ...................................................... H04L 29/00
See application file for complete search history.

(56) References Cited

U.S. PATENT DOCUMENTS 6,880,016 B1    4/2005   Van Der Heijden et al.
6,925,571 B1    8/2005   Motoyama et al.
(Continued)

FOREIGN PATENT DOCUMENTS

WO    WO 2004/104765    12/2004

OTHER PUBLICATIONS

Borenstein, N. et al., "Part One: Mechanisms for Specifying and Describing the Format of Internet Message Bodies", MIME (Multipurpose Internet Mail Extensions), Internet Standards Track RFC 1521, Sep. 1993, 75 pgs.
(Continued)

*Primary Examiner* — Lynn Feild
*Assistant Examiner* — Keyvan Emdadi
(74) *Attorney, Agent, or Firm* — Danielle Johnston Holmes; Micky Minhas

(57) ABSTRACT

The claimed subject matter provides systems and/or methods that facilitate interpreting Multipurpose Internet Mail Extensions (MIME) data. An interface can obtain MIME data. For instance, a stream of MIME data can be obtained, MIME data can be loaded from a static file, etc. Moreover, any disparate type of RFC 822 data can additionally or alternatively be received by the interface. Also, a MIME reader can analyze the MIME data (and/or normalized RFC 822 data) to interpret encoded structural information and generate at least one primitive based on the encoded structural information. Further, a hierarchical model can be built utilizing the at least one primitive.

20 Claims, 19 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 7,366,757 B1* | 4/2008 | Ushida | 709/206 |
| 8,214,439 B2 | 7/2012 | Williams et al. | |
| 8,549,088 B2 | 10/2013 | Williams et al. | |
| 2002/0026464 A1* | 2/2002 | Jones et al. | 708/200 |
| 2002/0082730 A1 | 6/2002 | Capps et al. | |
| 2002/0120940 A1* | 8/2002 | Willard | 725/91 |
| 2005/0108639 A1 | 5/2005 | Fields et al. | |
| 2005/0172018 A1* | 8/2005 | Devine et al. | 709/223 |
| 2005/0246538 A1 | 11/2005 | Brown et al. | |
| 2006/0288219 A1 | 12/2006 | Adams et al. | |
| 2007/0016613 A1* | 1/2007 | Foresti et al. | 707/104.1 |
| 2007/0162981 A1 | 7/2007 | Morioka et al. | |

OTHER PUBLICATIONS

European Communication in EP Application 06839195.2, mailed May 22, 2012, 1 page.
European Decision to Grant mailed May 24, 2013 for Application No. 06839195.2, 2 pages.
European Search Report dated May 3, 2012 for Application No. 06839195.2, 10 pgs.
European Communication in Application No. 06839195.2, mailed Jan. 4, 2013, 7 pages.
Moore, K., "Part Two: Message Header Extensions for Non-ASCII Text", MIME (Multipurpose Internet Mail Extensions), Internet Standards Track RFC 1522, Sep. 1993, 10 pgs.
PCT International Search Report and Written Opinion in Application PCT/US2006/046819, mailed Mar. 29, 2007, 10 pgs.
RFC 2822, Internet Message Format, Apr. 2001, P. Resnick, 51 pgs.
RFC 822, Standard for the Format of ARPA Internet Text Messages, Aug. 1982, D. Crocker, 50 pgs.
Schmidt, Nikita et al. "Rule-driven processing of tree-structured data using pointed trees," Computer Standards and Interfaces, vol. 25, No. 5, published Sep. 1, 2003, 14 pgs.
U.S. Appl. No. 11/278,882, Amendment and Response filed Oct. 30, 2009, 12 pgs.
U.S. Appl. No. 11/278,882, Amendment and Response filed Dec. 6, 2010, 11 pgs.
U.S. Appl. No. 11/278,882, Amendment and Response filed Mar. 26, 2009, 19 pgs.
U.S. Appl. No. 11/278,882, Amendment and Response filed May 18, 2010, 9 pgs.
U.S. Appl. No. 11/278,882, Notice of Allowance mailed Mar. 1, 2012, 9 pgs.
U.S. Appl. No. 11/278,882, Notice of Allowance mailed Mar. 9, 2011, 9 pgs.
U.S. Appl. No. 11/278,882, Office Action mailed Nov. 26, 2008, 14 pgs.
U.S. Appl. No. 11/278,882, Office Action mailed Dec. 18, 2009, 13 pgs.
U.S. Appl. No. 11/278,882, Office Action mailed Jun. 30, 2009, 14 pgs.
U.S. Appl. No. 11/278,882, Office Action mailed Aug. 4, 2010, 15 pgs.
U.S. Appl. No. 13/526,790, Amendment and Response filed Apr. 16, 2013, 4 pgs.
U.S. Appl. No. 13/526,790, Amendment and Response filed Nov. 14, 2012, 12 pgs.
U.S. Appl. No. 13/526,790, Notice of Allowance mailed May 13, 2013, 4 pgs.
U.S. Appl. No. 13/526,790, Office Action mailed Aug. 14, 2012, 19 pgs.
U.S. Appl. No. 13/526,790, Office Action mailed Jan. 16, 2013, 11 pgs.
U.S. Appl. No. 13/526,790, Amendment and Response filed Aug. 13, 2013, 4 pgs.

* cited by examiner

DOCUMENT OBJECT MODEL API FOR MIME

CROSS-REFERENCE TO RELATED APPLICATIONS

This application claims the benefit of U.S. patent application Ser. No. 13/526,790 filed on Jun. 19, 2012, now U.S. Pat. No. 8,549,088 issued Oct. 1, 2013, which claims the benefit of U.S. patent application Ser. No. 11/278,882 filed Apr. 6, 2006, now U.S. Pat. No. 8,214,439 issued Jul. 3, 2012, which claims priority from U.S. Provisional Application Ser. No. 60/742,667 filed on Dec. 6, 2005, and entitled DOCUMENT OBJECT MODEL API FOR MIME. The entirety of the aforementioned application is incorporated herein by reference.

BACKGROUND

Technological advances in computer hardware, software and networking have lead to efficient, cost effective computing systems (e.g., desktop computers, laptops, handhelds, cell phones, servers, . . . ) that can communicate with each other from essentially anywhere in the world in order to exchange information. These systems continue to evolve into more reliable, robust and user-friendly systems. As a consequence, more and more industries and users are purchasing computers and utilizing them as viable electronic alternatives for communicating with disparate users at remote locations, gathering information (e.g., from disparate users), retaining information, etc.

Recently, email usage has grown in popularity as a common manner by which users communicate with each other. Email allows for composing, sending, and receiving electronic communications. Transmission of email across the Internet, for instance, can be in accordance with the Simple Mail Transfer Protocol (SMTP), which is a text-based protocol where one or more recipients of a message can be specified and the message can be transferred. The email message can be formatted according to the standard described in RFC 822 (and/or RFC 2822). Messages defined pursuant to RFC 822 (and/or RFC 2822) typically include two sections. The first section relates to headers that can comprise a message summary, sender, receiver, and other information concerning the email. For instance, headers can include a name and a value defined pursuant to the syntax specified by RFC 822 (and/or 2822). The second section can be associated with a body, which can be the message itself. RFC 822 (and/or RFC 2822) commonly relates to simple text email written in 7-bit US-ASCII. For example, the headers can be simple text strings such as the subject of the email, structured composite headers such as a recipient list, well defined headers, and arbitrary headers.

Multipurpose Internet Mail Extensions (MIME) is an extension to RFC 822 (and RFC 2822) that can support transferring additional kinds of information in email. For instance, MIME can support nesting and relational representations of multiple payloads (e.g., a body with a number of attachments). Additionally, MIME can provide multiple character set support, content language annotation, content transfer encoding schemes and an increased number of well defined headers and associated meanings. MIME enables these additional functionalities while still being considered a valid RFC 822 (and/or 2822) payload.

As noted above, MIME can be employed in connection with email communication. MIME can also be leveraged for various other purposes. For instance, MIME can be employed in connection with form submissions for web based browsers. Thus, MIME can enable packaging responses for HyperText Transfer Protocol (HTTP) form submissions when providing (e.g., posting) information to a web site. Additionally, MIME can be utilized as a format for storage of content (e.g., a document that can be created via utilizing a word processing application and can be stored in a web format). As such, usage of MIME is becoming more prevalent; however, viewing and/or editing MIME content is difficult utilizing conventional techniques.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate interpreting Multipurpose Internet Mail Extensions (MIME) data. The MIME data can be streamed and/or can be loaded from a static file that includes the MIME data. According to various aspects, a programming API can be provided which can be a foundation upon which more advanced functionality can be built. Additionally, the systems and/or methods can provide for handling of various boundary conditions and/or deviations from the RFC standards (e.g., RFC 822, RFC 2822, . . . ).

According to various features of the claimed subject matter, structural information encoded within the MIME data can be interpreted and a hierarchical model of the document can be generated. The model (e.g., document object model) can be accessed concurrently with the analysis of the MIME data and/or subsequent to such analysis. Thus, advantages can be provided over conventional techniques due to the ability to control the analysis of the MIME data (e.g., restrict downloading of an email upon a determination of the email being spam or including a virus, . . . ). It is to be appreciated that a model of the MIME data need not be produced and/or outputted. Rather, external functionality can review the content of the MIME data and apply higher level functionality.

Pursuant to one or more aspects of the claimed subject matter, a MIME reader can analyze encoded structural aspects related to RFC 822 data and/or MIME data and yield corresponding primitive(s). By way of illustration, the MIME data can be related to email messages, responses for HTTP form submissions, documents saved in a web format, etc. According to an example, obtained RFC 822 data can be converted into a normalized MIME form. Moreover, a MIME writer can complement the MIME reader and generate MIME data from base primitives (e.g., text primitives such as a string, binary primitives such as a byte stream object or byte array, . . . ).

In accordance with various aspects of the claimed subject matter, a MIME document object instance can be accessed and/or manipulated pursuant to a document object model. The document object model can provide various classes that can enable building the MIME document (e.g., by indicating nodes that can be located under disparate nodes, . . . ), navigating a structure of the MIME document, and/or adding, modifying and/or deleting elements or content within the MIME document. For example, the classes associated with the document object model can provide for transferring, encoding, decoding, etc. of content within the MIME document object instance.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
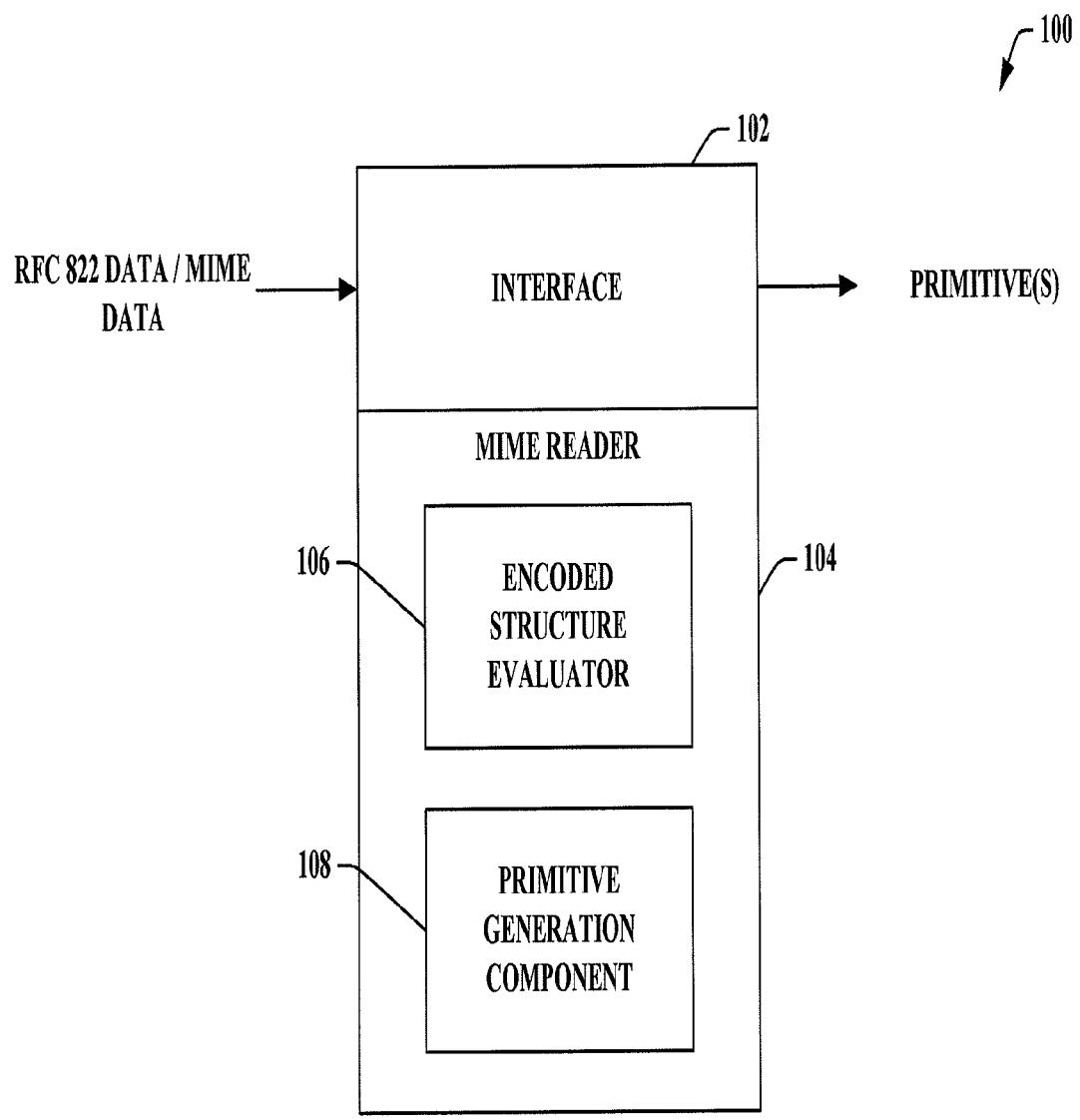
FIG. 1 illustrates a block diagram of an exemplary system that facilitates interpreting Multipurpose Internet Mail Extensions (MIME) data.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "evaluator," "generator," "reader," "writer," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates interpreting Multipurpose Internet Mail Extensions (MIME) data. The system 100 can include an interface 102 that obtains RFC 822 data and/or MIME data. For instance, a stream of RFC 822 data and/or MIME data can be provided to the interface 102. Additionally or alternatively, the interface 102 can facilitate loading a static file comprising RFC 822 data and/or MIME data into memory; thereafter, the loaded data can be further processed as described below. The interface 102 can support RFC 822 data and/or MIME data that can be pushed at the interface 102 and/or the interface 102 can facilitate pulling the RFC 822 data and/or MIME data from a source. The RFC 822 data and/or MIME data obtained via the interface 102 can be provided to a MIME reader 104.

The RFC 822 data and/or MIME data obtained by the interface 102 can be received from any source. For example, the interface 102 can receive the RFC 822 data and/or MIME data from a server such as an email server, a web server, etc. Additionally or alternatively, the interface 102 can obtain the RFC 822 data and/or the MIME data from a client (e.g., personal computer, PDA, cell phone, anti-virus application, spam application, . . . ). Further, the interface 102 can obtain the RFC 822 data and/or MIME data from a data store (not shown). The data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Moreover, the interface 102 (as well as the MIME reader 104) can be employed by a server and/or a client. Although the interface 102 is depicted as being separate from the MIME reader 104, it is contemplated that the MIME reader 104 can include the interface 102 or a portion thereof. Also, the interface 102 can provide various adapters, connectors, channels, communication paths, etc. to enable interaction with the MIME reader 104.

The RFC 822 data and/or the MIME data can be provided by the interface 102 to the MIME reader 104. The MIME reader 104 can include an encoded structure evaluator 106 that analyzes structural information associated with the RFC 822 data and/or MIME data. By way of example, the encoded structure evaluator 106 can parse the RFC 822 data and/or the MIME data obtained by way of the interface 102. Additionally, the MIME reader 104 can include a primitive generation component 108 that can create primitive(s) corresponding to the structural information identified by the encoded structure evaluator 106; these primitive(s) can thereafter be outputted via the interface 102. Further, although not shown, it is to be appreciated that the MIME primitive(s) can additionally or alternatively be output by the MIME reader 104. For instance, the primitive(s) can be text primitive(s) such as string(s), binary primitive(s) such as byte stream object(s) and/or byte array(s), etc.

According to another aspect, the primitive(s) generated via the MIME reader 104 can be utilized to generate a hierarchical model associated with the MIME data. For example, the primitive(s) produced by the MIME reader 104 can be outputted utilizing the interface 102 (and/or by the MIME reader 104), and an external component (not shown) can employ the primitive(s) to create a hierarchical model of the MIME data. Thus, additional functionality can be built upon the output provided by the MIME reader 104. Pursuant to another example, a hierarchical model of the MIME data can be generated from the primitive(s) obtained via the MIME reader 104 and thereafter the hierarchical model (e.g., document object model) can be provided as an output via the interface 102. It is to be appreciated that the MIME reader 104 can generate primitive(s) as a stream of RFC 822 data and/or MIME data is being evaluated. Additionally or alternatively, the MIME reader 104 can provide primitive(s) corresponding to a static file of RFC 822 data and/or MIME data or a portion thereof. For instance, as the static file of RFC 822 data and/or MIME data is evaluated, the primitive(s) corresponding to the portion of the data already analyzed via the MIME reader 104 can be made available (e.g., outputted via the interface 102 and/or the MIME reader 104, able to be navigated and/or manipulated, . . . ).

The MIME reader 104 can facilitate providing a uniform interpretation of the RFC 822 data and/or the MIME data. The MIME reader 104 (and/or the encoded structure evaluator 106) can provide flexibility associated with parsing the RFC 822 data and/or the MIME data. Additionally, the MIME reader 104 can support scanning RFC 822 data and/or MIME data with or without yielding a hierarchical model (e.g., document object model) of the data.

The encoded structure evaluator 106 can identify structural information included within the RFC 822 data and/or the MIME data. For instance, the encoded structure evaluator 106 can identify a header, a body, a start of a child, a subject, an attachment, and the like. Pursuant to an example, the RFC 822 data and/or the MIME data can include a header name, a delimiter (e.g., colon) and a string of characters. A line break can be inserted in the value section and continued on the next line by inserting a whitespace character (e.g., tab or space). The encoded structure evaluator 106 can identify that a header is comprised within the RFC 822 data and/or the MIME data as well as determine a name of the particular header and/or a value associated with the header. The primitive generation component 108 can employ the information provided by the encoded structure evaluator 106 to produce primitive(s) corresponding to the RFC 822 data and/or the MIME data. Accordingly, the primitive generation component 108 enables the content to be viewed (e.g., during streaming of the RFC 822 data and/or the MIME data, during evaluation of the RFC 822 data and/or the MIME data, subsequent to evaluation, . . . ). Further, as the primitive generation component 108 provides an associated output, additional functionality (e.g., internal and/or external) can be built upon that output. For example, the primitive generation component 108 can yield an output related to low level primitives, which can be assembled into a more logical form (e.g., hierarchical model) and/or held in memory by a component (not shown) external to the MIME reader 104.

It is to be appreciated that the MIME data can be any data formatted according to the Multipurpose Internet Mail Extensions (MIME) standard. For instance, the MIME data can be related to email messages (e.g., in a textual format that can be serialized over SMTP), responses for HTTP form submissions, documents saved in a web format, etc. MIME can be an extension to RFC 822; accordingly, the resultant MIME data can be formatted in such a manner as to be considered a valid RFC 822 payload. Additionally, most email currently flowing over SMTP can be valid RFC 822 content with MIME providing a highest fidelity. By way of example, an extension supported by MIME relates to globalization. Whereas RFC 822 can be associated with 7-bit US-ASCII, MIME enables use of additional characters. Thus, a name that could only be viewed in English utilizing RFC 822 can be seen in Hungarian, Chinese, or any disparate language via employing MIME. Moreover, it is contemplated that RFC 822 data can be obtained (e.g., by the interface 102) and analyzed (e.g., by the MIME reader 104, the encoded structure evaluator 106, and/or the primitive generation component 108, . . . ) to yield primitive(s).

Figure 2:
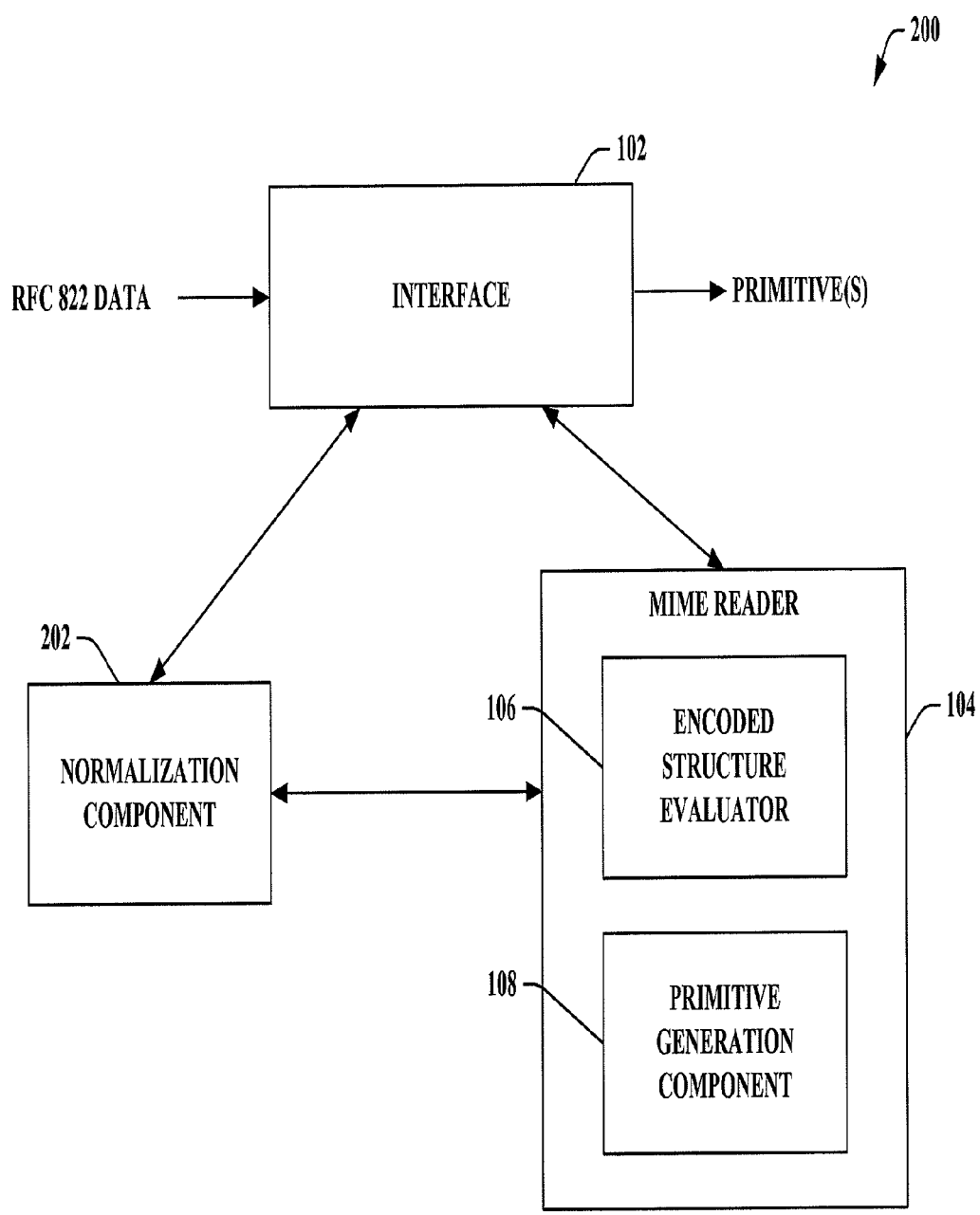
FIG. 2 illustrates a block diagram of an exemplary system that facilitates normalizing disparate forms of RFC 822 data.

With reference to FIG. 2, illustrated is a system 200 that facilitates normalizing disparate forms of RFC 822 data. The system 200 can include the interface 102, the MIME reader 104, the encoded structure evaluator 106 and/or the primitive generation component 108 as described above. Further, the system 200 includes a normalization component 202 that interprets and converts RFC 822 data with differing formats into a normalized form of MIME data.

By way of illustration, the interface 102 can receive RFC 822 data (e.g., by obtaining a stream of data, loading a static file, . . . ). The data received by the interface 102 can be in a form that complies with RFC 822, yet is outside the scope of the MIME format. For instance, the RFC 822 data can include inline attachments and/or any archaic form of attachments.

The RFC 822 data can be provided to the normalization component 202. Additionally, the normalization component 202 can alter the RFC 822 data into a format consistent with MIME. For example, the normalization component 202 can enable modifying a structure, content, syntax, and the like associated with the received RFC 822 data; however, the claimed subject matter is not so limited. The altered RFC 822 data yielded by the normalization component 202 can be provided to the MIME reader 104, which can generate corresponding primitive(s) by employing the encoded structure evaluator 106 and/or the primitive generation component 108. Further, although not shown, it is to be appreciated that the MIME reader 104 can include the normalization component 202 or a portion thereof. Moreover, it is contemplated that the normalization component 202 can be utilized in connection with any of the systems described herein; for instance, RFC 822 data can be obtained (in addition to or instead of MIME data) and/or converted by employing the normalization component 202.

Figure 3:
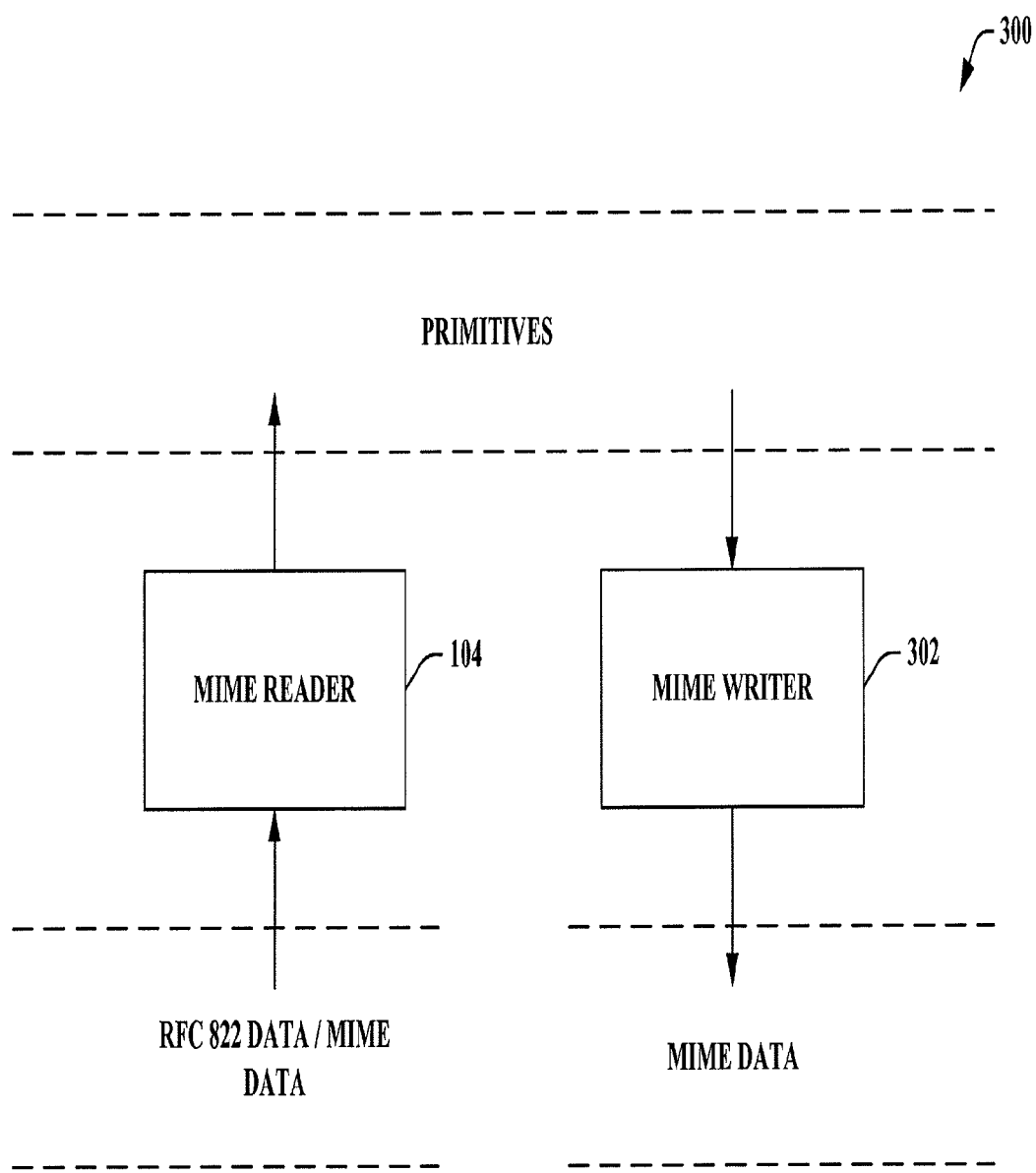
FIG. 3 illustrates a block diagram of an exemplary system that enables interpreting and/or authoring MIME data.

Turning to FIG. 3, illustrated is a system 300 that enables interpreting and/or authoring MIME data. The system 300 includes the MIME reader 104 and a MIME writer 302. The MIME reader 104 evaluates RFC 822 data and/or MIME data and can generate corresponding primitive(s). By way of illustration, the MIME reader 104 can employ a normalization component (not shown) (e.g., the normalization component 202 of FIG. 2, . . . ) to convert RFC 822 data into a MIME related form; however, the claimed subject matter is not so limited. The MIME writer 302 can be complementary to the MIME reader 104 and can facilitate creating valid content (e.g., MIME data).

Pursuant to an example, the MIME reader 104 can interpret structure encoded in the RFC 822 data and/or the MIME data and provide primitive(s). As the MIME reader 104 evaluates the RFC 822 data and/or the MIME data, the resultant output can be made available for viewing and/or altering. Additional functionality can be built upon the MIME reader 104. By way of example, functionality can be provided that generates a hierarchical model of the RFC 822 data and/or the MIME data utilizing the output provided by the MIME reader 104. Additionally or alternatively, further functionality can be provided by a disparate component (not shown) that employs the output yielded by the MIME reader 104; thus, the MIME reader 104 can provide a low level output which can be employed by a caller of the MIME reader 104.

It is to be appreciated that the MIME reader 104 can support both loading an entire static file associated with RFC 822 data and/or MIME data into memory and/or loading only a portion of the RFC 822 data and/or the MIME data at a time, thereafter removing that portion and loading a disparate portion of the data. The MIME reader 104 (and/or the MIME writer 302) can enable reading and writing sequentially; thus, the need to load an entire static file into memory can be mitigated. Additionally or alternatively, the MIME reader 104 can support loading an entire file related to RFC 822 data and/or MIME data into memory and thereafter manipulating and/or evaluating the data.

The MIME writer 302 can utilize the primitive(s) to generate MIME data. Thus, pursuant to an example, a portion of a hierarchical object model can be modified (e.g., via employing external and/or internal functionality built upon the output yielded by the MIME reader 104, . . . ). The MIME writer 302 can effectuate altering the MIME data to correspond to the changes made to the hierarchical object model. According to a further illustration, the MIME reader 104 can evaluate RFC 822 data and yield primitive(s) by converting the RFC 822 data into valid MIME content. Thereafter, the MIME writer 302 can be employed to generate corresponding MIME data from the primitive(s). Thus, RFC 822 data can be converted to MIME data by way of employing the MIME reader 104 and the MIME writer 302; however, the claimed subject matter is not so limited.

Figure 4:
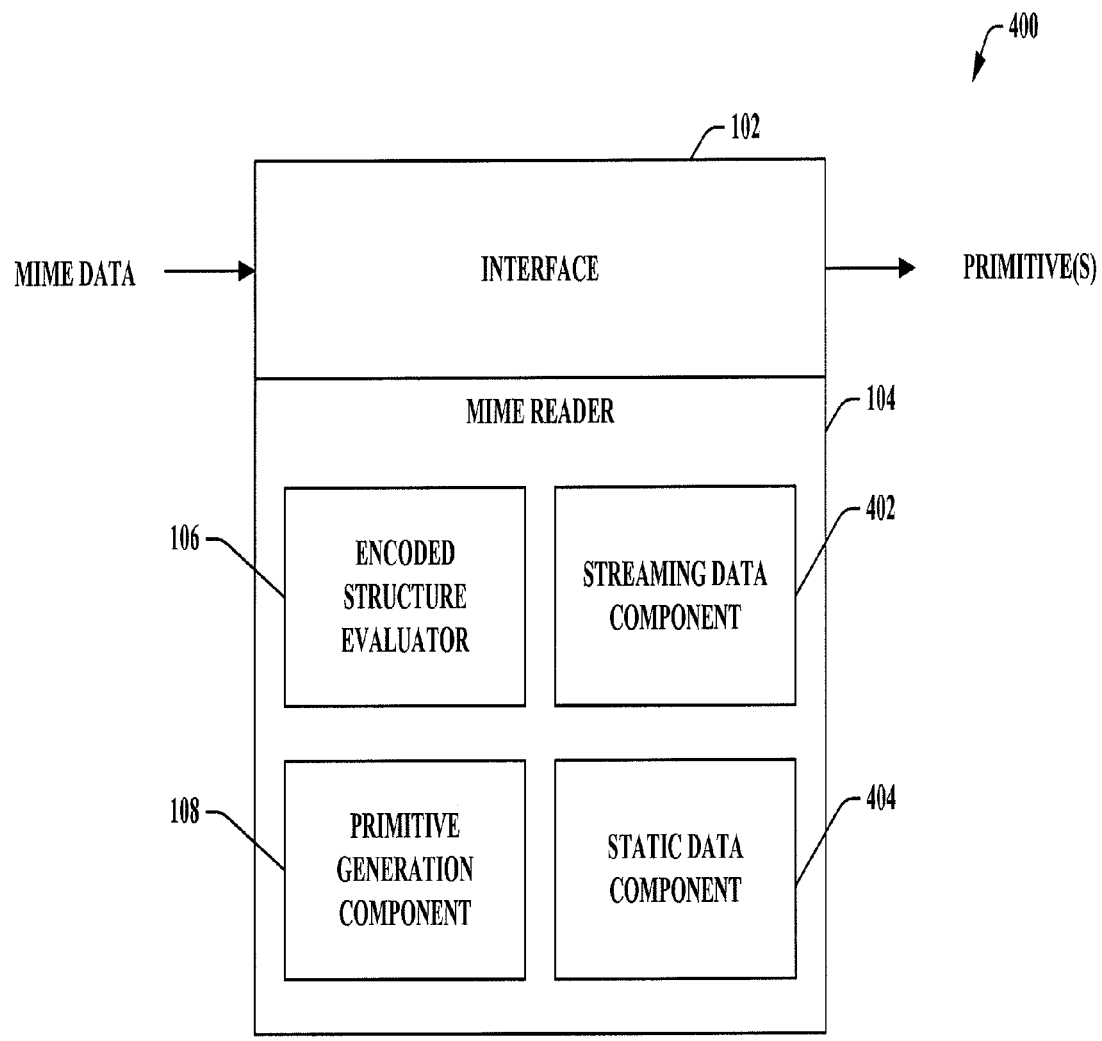
FIG. 4 illustrates a block diagram of an exemplary system that supports obtaining a stream of MIME data and/or loading a static file of MIME data.

With reference to FIG. 4, illustrated is a system 400 that supports obtaining a stream of MIME data and/or loading a static file of MIME data. The system 400 includes the interface 102 that obtains MIME data. Additionally or alternatively, it is to be appreciated that the interface 102 can obtain any RFC 822 data. The MIME data can be provided by the interface 102 to the MIME reader 104, which can interpret information encoded therein. The MIME reader 104 can include the encoded structure evaluator 106 that analyzes structural information included in the MIME data. Further, the MIME reader 104 can include the primitive generation component 108 that can yield primitive(s) associated with the MIME data that is analyzed by the encoded structure evaluator 106.

The MIME reader 104 can further include a streaming data component 402 that analyzes the MIME data as the MIME data is streamed to the MIME reader 104 via the interface 102. Accordingly, the streaming data component 402 can support pushing data at the MIME reader 104. Thus, the streaming data component 402 can be employed in connection with applications such as an SMTP service that receives an email as chucks of data. The streaming data component 402 differs from conventional techniques where the full content associated with the MIME data would typically have to be received prior to analyzing the content, yielding primitive(s) related to the content, and/or generating a hierarchical model associated with the content (e.g., loading into a document object model).

The MIME reader 104 can further include a static data component 404 that obtains a static file that comprises the MIME data and subsequently analyzes the MIME data. The static data component 404 supports static loading of the MIME data. Depending whether the streaming data component 402 or the static data component 404 is employed, performance or memory can be impacted.

Figure 5:
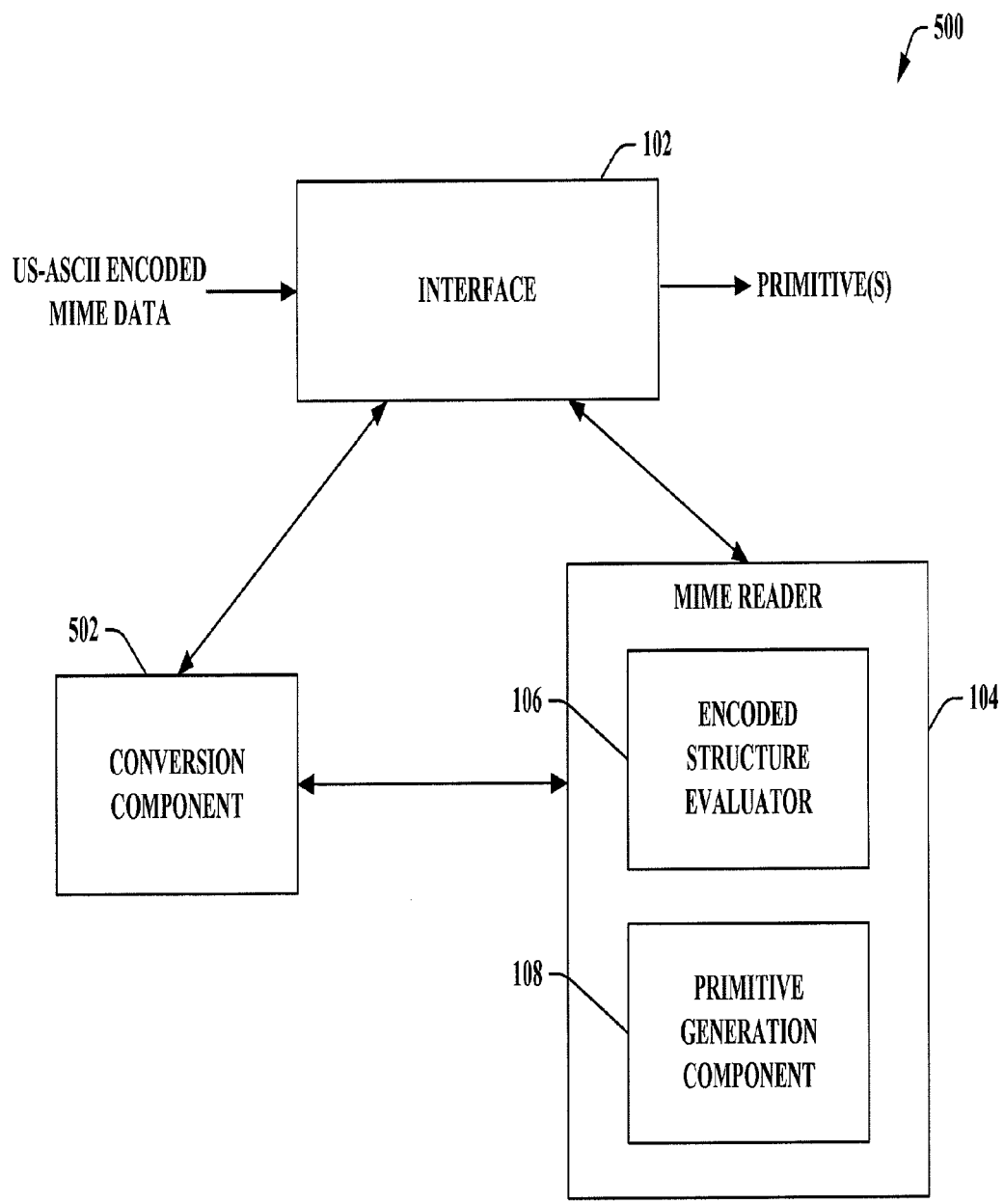
FIG. 5 illustrates a block diagram of an exemplary system that enables converting data to and/or from Unicode.

Referring to FIG. 5, illustrated is a system 500 that enables converting data to and/or from Unicode. The system 500 includes the interface 102 that receives MIME data, which can be US-ASCII encoded data. The system 500 can additionally include the MIME reader 104, which can further include the encoded structure evaluator 106 and/or the primitive generation component 108. Further, a conversion component 502 can convert US-ASCII encoded data to Unicode data.

By way of illustration, the interface 102 can obtain a stream of MIME data. The stream of MIME data can be provided to the conversion component 502, which can enable converting the MIME data to Unicode. The converted data can be analyzed by the MIME reader 104 (and/or the encoded structure evaluator 106 and/or the primitive generation component 108) to generate corresponding primitive(s). According to another example, the MIME reader 104 (and/or a hierarchical model generator (not shown)) can evaluate received MIME data and generate associated MIME header object(s). The MIME reader 104 (and/or the hierarchical model generator) can point the conversion component 502 to the data associated with the MIME header object(s) to enable converting the data to Unicode. Pursuant to a further example, the conversion component 502 can allow for converting Unicode data back to US-ASCII, for instance.

In accordance with a further illustration, the MIME reader 104 (and/or a hierarchical model generator) can enable delayed parsing. For instance, delayed parsing can be advantageous when data may yield a failure and/or consume large amounts of processing resources. By way of example, the MIME reader 104 can allow for separating MIME data into a header, a body, a sub-body part, etc. Thereafter, the MIME header object(s) can be further parsed (e.g., with the encoded structure evaluator 106, . . . ) at a time of evaluation of such object(s). Additionally or alternatively, the MIME reader 104 (and/or the hierarchical model generator) can yield object(s) associated with multiple documents simultaneously, for example. According to an illustration, the MIME reader 104 (and/or the hierarchical model generator) can enable concurrently building multiple document object models corresponding to embedded messages; however, the claimed subject matter is not so limited.

Figure 6:
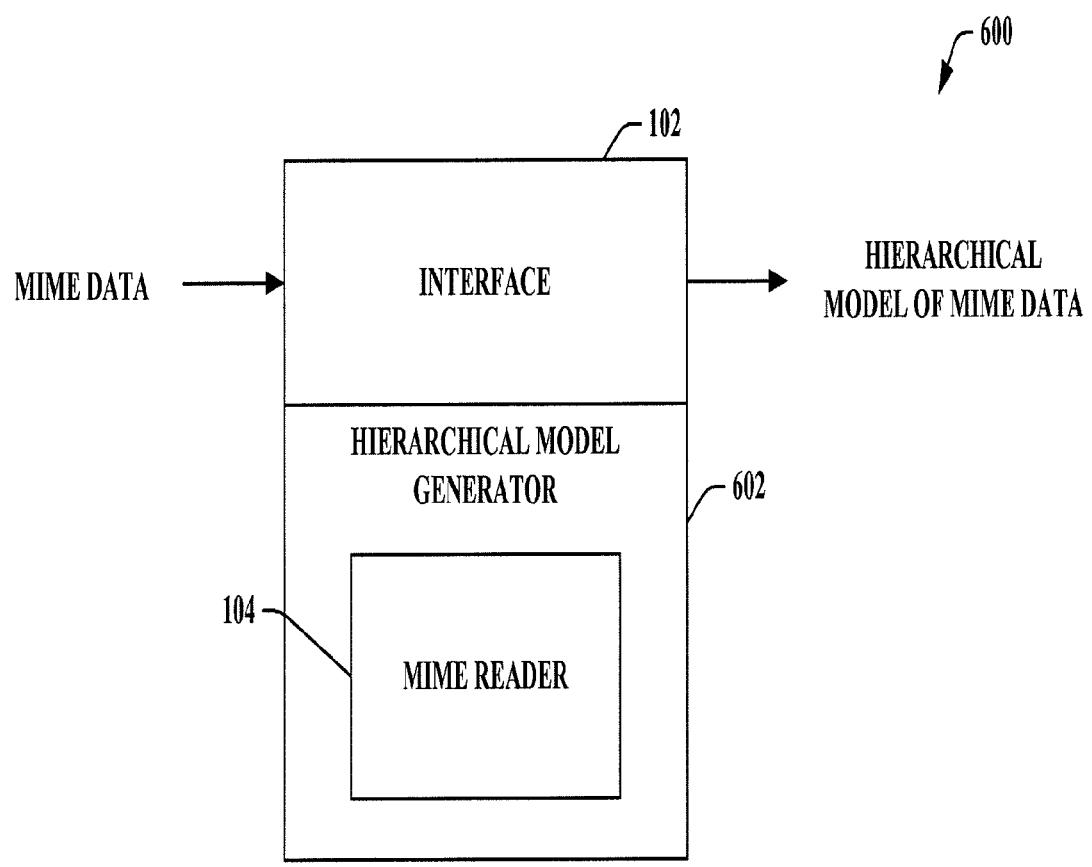
FIG. 6 illustrates a block diagram of an exemplary system that generates a hierarchical model associated with MIME data.

Turning to FIG. 6, illustrated is a system 600 that generates a hierarchical model associated with MIME data. The system 600 includes the interface 102 that obtains MIME data. Additionally or alternatively, the interface 102 can receive RFC 822 data, which can be interpreted by a normalization component (not shown) (e.g., the normalization component 202 of FIG. 2, . . . ). For instance, the interface 102 can receive a stream of MIME data and/or enable loading a static file associated with the MIME data. The interface 102 can additionally provide the MIME data to a hierarchical model generator 602.

The hierarchical model generator 602 interprets the structure encoded in the MIME data (e.g., text) to build a hierarchical model of the document. For instance, each container can be represented as a part that includes a group of header objects and either content or a group of sub parts. Further, each of the sub parts can in turn include a group of header objects and either content or a group of additional sub parts. The hierarchical model generator 602 can include the MIME reader 104 to facilitate interpreting the MIME data. The hierarchical model generator 602, for instance, can utilize primitive(s) generated via the MIME reader 104 to build a hierarchical model of the MIME data.

The hierarchical model generator 602 can be associated with a library that can be written (e.g., completely written, partially written, . . . ) in managed code and can provide considerable performance throughput; however, the claimed subject matter is not so limited. The managed code can be utilized to mitigate programming errors and interoperability. Thus, the programming model can be effectuated across a group of languages that conform to the common language runtime (CLR) (e.g., visual basic, C#, C++, Java, . . . ). It is to be appreciated that the hierarchical model generator 602 (and/or the MIME reader 104 and/or the MIME writer (not shown)) can be an API. The hierarchical model generator 602 (and the associated library) can be employed to determine a first order validity of the MIME and alter (e.g., fix) some of the content to provide a consistent interpretation across different applications.

By way of illustration, the hierarchical model generator 602 can interpret the following:
Mime-Version: 1.0
Subject: This is the subject of this document.
Content-type: multipart-mixed; boundary="boundary=
 "fbf75bb6-0e05-46fd-b325-61a565a4f54a"
--fbf75bb6-0e05-46fd-b325-61a565a4f54a
Content-type: text/plain
x-Label: section 1
The left and right hand.
--fbf75bb6-0e05-46fd-b325-61a565a4f54a
Content-type: text/plain
x-Label: section 2
xyw 1 d21 rel2 ddd dey
--fbf75bb6-0e05-46fd-b325-61a565a4f54a
Content-type: text/plain
x-Label: section 3
Widgets and wombats.
--fbf75bb6-0e05-46fd-b325-61a565a4f54a-

The hierarchical model generator 602 can yield, for example, a MIME document object instance that can allow a calling program to navigate and/or manipulate the content as objects. Pursuant to the above example, the hierarchical model generator 602 can provide the MimeDocument illustrated in FIG. 7.

Figure 7:
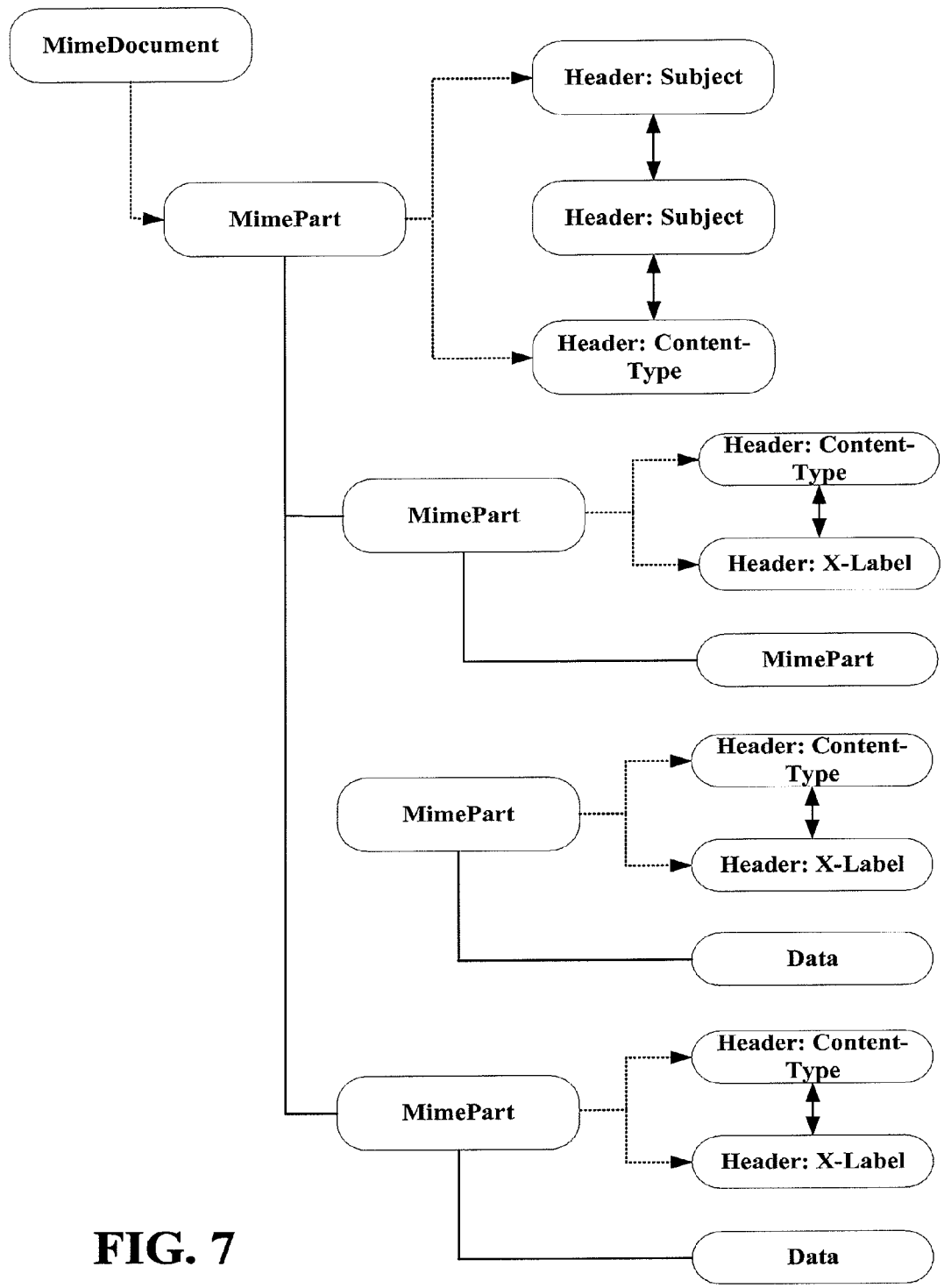
FIG. 7 illustrates an exemplary document object instance.

With reference to FIG. 7, the MimeDocument can be a class that implements the MIME RFC 2822 compliant parser and holds a resulting Document Object Model (DOM). The DOM can be an in-memory (cache) tree representation of an MIME document and can enable navigation and editing of this document. Moreover, the MIME DOM can include extensible object(s). For instance, nested nodes may be added at a later time and/or new objects (e.g., headers) derived from base class(es) can be correctly serialized and manipulated; thus, an existing framework can be extended.

There can be two ways to load MIME data into an instance. The first involves instantiating an instance of this class and then calling the Load method that takes a stream to where the document is loaded from. The alternative can be to write the MIME into a stream returned by the GetLoadStream method. The stream instance returned can support write only semantics and can be used to push parts of a MIME source into the lexical parser. The former can be a synchronous atomic method which results in a fully formed DOM whereas the latter can allow dynamic parsing and loading as blocks arrive from some source.

The resulting DOM attempts to layer itself on top of the raw data and reference back into the stream for content. By doing so it can allow the memory footprint to be limited to a skeletal representation of the content with the bulk of the data safely stored within the source stream. The source stream may not exist in the case where the data is "written" into the load stream or if the stream past in to the Load call does not support random access. In these cases, the MimeDocument can create a temporary stream that does support random access to achieve its goal. Additionally, a number of Mime-Parts can be depicted. Each MimePart or entity can contain a set of headers and either a data section or a set of child parts. As illustrated, inner MimePart objects may include a set of headers, disparate MimePart(s), or data (e.g., a text portion or a payload for an image, . . . ).

Figure 8:
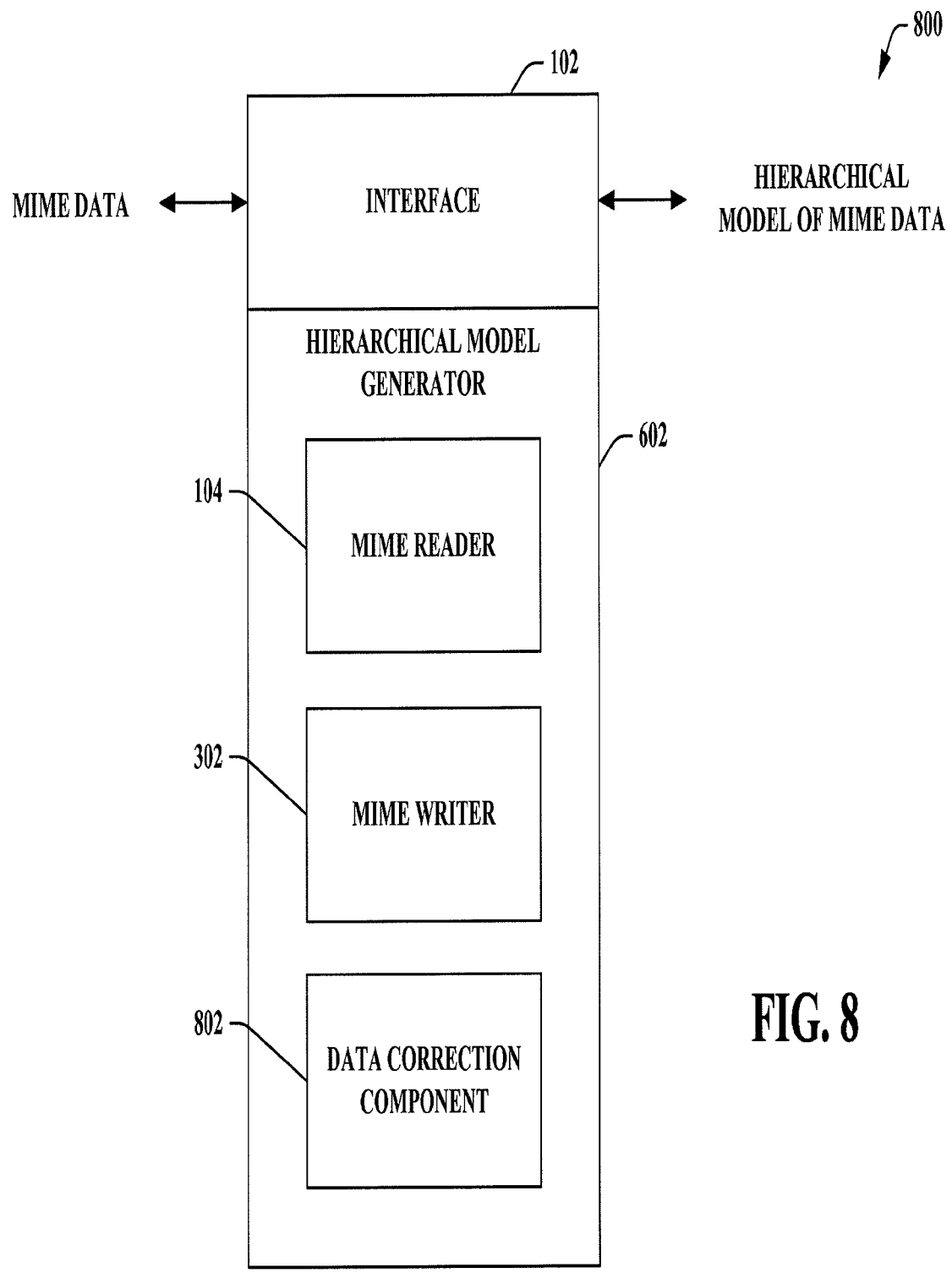
FIG. 8 illustrates a block diagram of an exemplary system that is resistant to flaws or inconsistencies in MIME data.

With reference to FIG. 8, illustrated is a system 800 that is resistant to flaws or inconsistencies in MIME data. The system 800 includes the interface 102 that receives static files and/or streams of data related to MIME content. The interface 102 provides the MIME data to the hierarchical model generator 602, which can generate a hierarchical model from the MIME data.

The hierarchical model generator 602 can further include the MIME reader 104, the MIME writer 302, and a data correction component 802. Unlike formats such as XML, the tolerance to mistakes, omissions, or corruptions for MIME can be held to a different standard. Thus, the data correction component 802 enables the ability to absorb and offer logical interpretation of malformed MIME content (e.g., boundary missing in a multi-part section, invalid wrapping of content to make it compatible with SMTP, . . . ). Continuing the above example from FIGS. 6 and 7, if the trailing line in the above sample content is missing, then there is no termination sequence for the "third" section and for the outermost wrapper. If this had been an XML document, the entire document would be considered invalid. However, the data correction component 802 can enable such content to be corrected.

By way of illustration, the MIME reader 104 can interpret the MIME data. As the MIME data is being interpreted, the data correction component 802 can identify corrupted data. Thus, the data correction component 802 can facilitate remedying the data error in both the hierarchical model generated by the hierarchical model generator 602 as well as the MIME data via authoring correct content with the MIME writer 302.

The MIME writer 302 and/or the data correction component 802 can identify digitally signed content. The system 800 can be employed in connection with signed and/or encrypted content (e.g., S/MIME content). For example, two disparate types of digitally signed content can exist: clear signed and opaque. If clear signed content is identified, a regular email client can see the client, for instance. Accordingly, if there is malformed data in clear signed content, the content should not be altered since the signature will be broken if changes are made. Thus, the hierarchical model generator 602, MIME reader 104, MIME writer 302 and/or data correction component 802 (and/or document object model) can preserve and not modify content if a clear signed message is detected. Accordingly, the content can be preserved so that the hash of the content is still valid.

Figure 9:
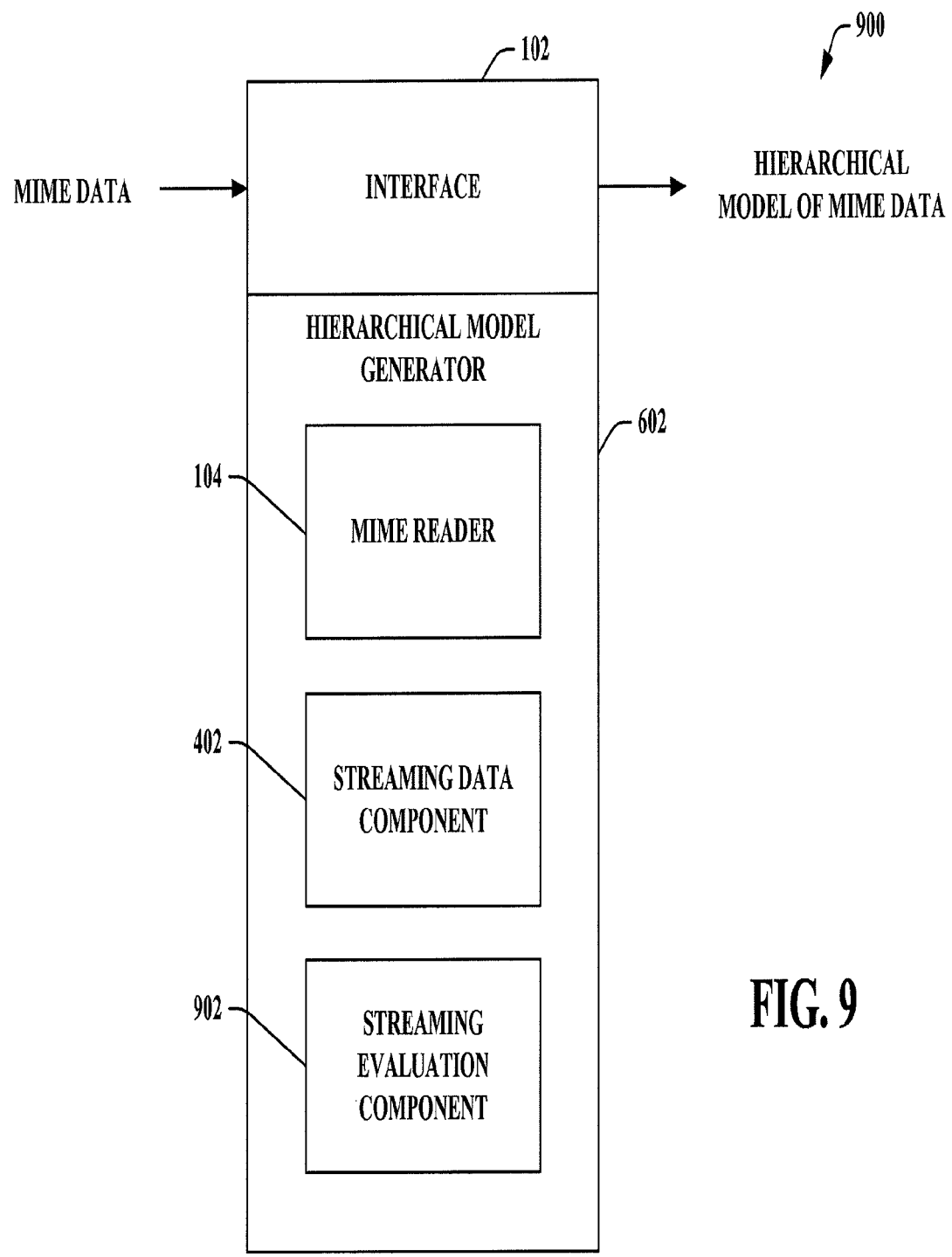
FIG. 9 illustrates a block diagram of an exemplary system that enables evaluating MIME data as it is being pushed at an interface.

With reference to FIG. 9, illustrated is a system 900 that enables evaluating MIME data as it is being pushed at the interface 102. A stream of MIME data can be obtained by the interface 102 and provided to the hierarchical model generator 602, which can yield a hierarchical model of the MIME data. The hierarchical model generator 602 can include the MIME reader 104, the streaming data component 402, and/or a streaming evaluation component 902. The MIME reader 104 can interpret structural information encoded in the MIME data and the streaming data component 402 can enable receiving and/or analyzing a stream of MIME data.

As opposed to conventional techniques where the full content typically is received prior to loading it into a document object model, the MIME reader 104 and/or the streaming data component 402 enable building a model as the MIME data is received and/or analyzed. Thus, the object model can be built simultaneously with the data being obtained (e.g., via the Internet, . . . ). An outside caller can walk through the model that is partially built and/or apply additional logic on top of the model built by the hierarchical model generator 602.

With large amounts of bogus content, data, and denial of service attacks, it is valuable to be able to apply a set of policy decisions against the content and determine if further resources should be expended. The streaming evaluation component 902 can enable the hierarchical model of the MIME data to be accessed while the data is still being received allowing for interpretation of the content as soon as possible. Additionally, the streaming evaluation component 902 can enable the parsing section of the API (e.g., MIME reader 706) to apply some restrictions.

For example, the streaming evaluation component 902 can enable controlling the following restrictions: the strictness/completeness of the MIME; the maximum number of nested parts allowed; the maximum size of the data; the maximum number of bytes allowed in what is considered headers; the maximum number of distinct parts; the maximum number of headers; the maximum number of "addressing" headers (e.g., to, from, . . . ); the maximum number of bytes in one header; and the maximum number of "parameter" fields on any supported structured header.

Figure 10:
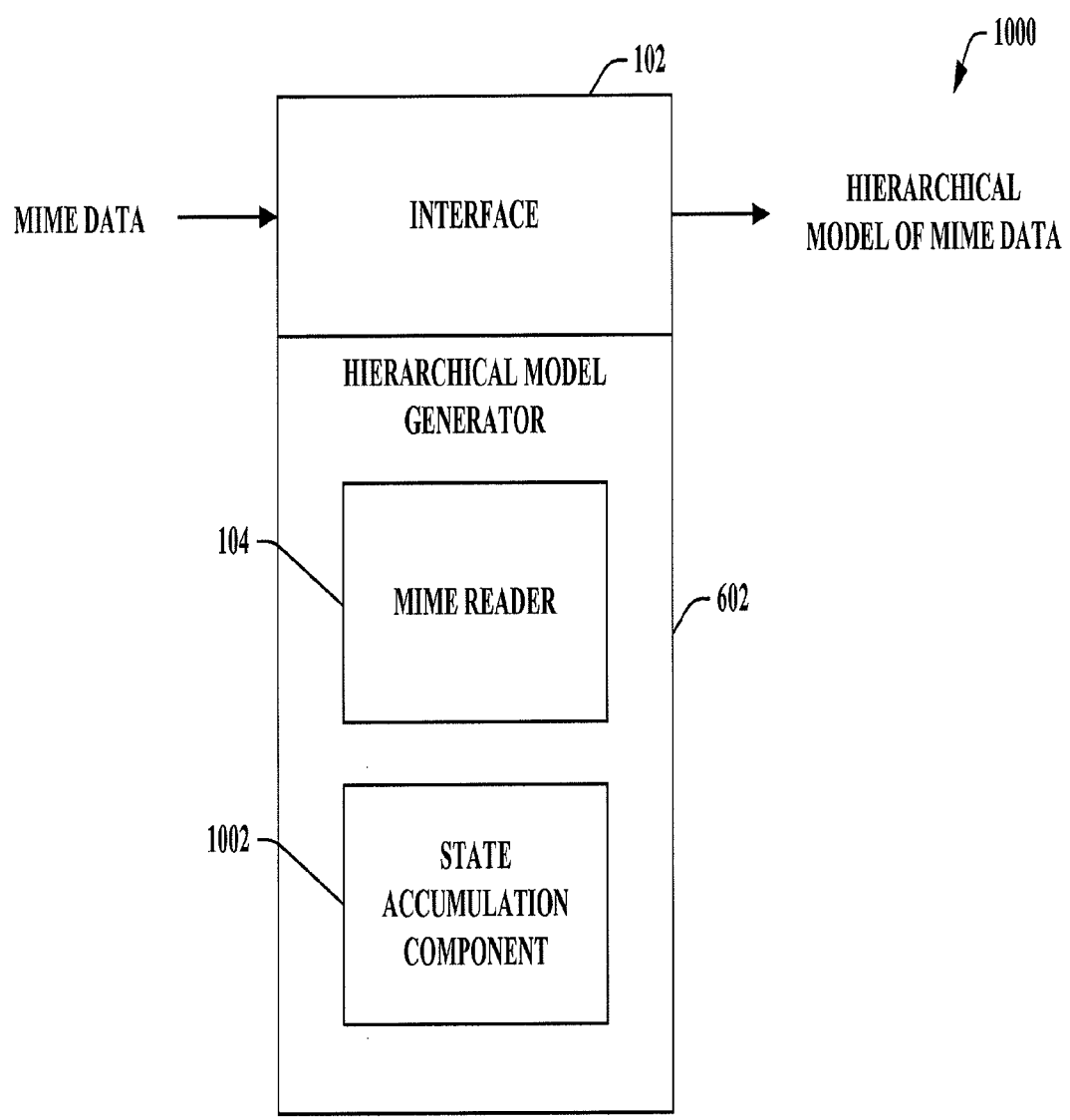
FIG. 10 illustrates a block diagram of an exemplary system that accumulates information associated with MIME data.

With reference to FIG. 10, illustrated is a system 1000 that accumulates information associated with MIME data. The system 1000 includes the interface 102 that receives MIME data. The interface 102 can provide the MIME data to the hierarchical model generator 602 that includes the MIME reader 104, which can facilitate analyzing the MIME data.

The hierarchical model generator 602 can additionally include a state accumulation component 1002 that can accumulate information as the MIME data is parsed (e.g., via the MIME reader 104, the encoded structure evaluator 106, . . . ). The information that is obtained by the state accumulation component 1002 can be based on data that has been identified and/or altered. For example, the state accumulation component 1002 can detect the following: missing multipart MIME boundaries; invalid boundary values (e.g., based on the RFC); invalid line wrapping; incorrect line termination; invalid header; missing separator after a group of headers; missing boundary parameter; undefined transfer encoding; and invalid external links.

The hierarchical model generator 602 can additionally enable the conversion of non-MIME content to MIME content. For instance, this can be accomplished utilizing a normalization component (e.g., the normalization component 202 of FIG. 2) and/or a data correction component (e.g., data correction component 802 of FIG. 8). Prior to the standardization of MIME, users extended text only email (RFC 822) to encapsulate attachments. Many email clients automatically included support for such attachments. Though invalid as far as the MIME standard is concerned, there is still a need to support non-MIME messages according to this format. Thus, in a MIME document layer and in the process of loading the MIME document, the hierarchical model generator 602 can convert these messages into a valid MIME format. Thus, the clients can be freed from supporting this behavior.

Headers in MIME can be composed of a header name, a delimiter (e.g., colon) and a string of characters. A line break can be inserted in the value section and continued on the next line by inserting a whitespace character (e.g., tab or space). Additionally, the headers can further be divided into three general categories as follows.

The first category can be an RFC defined text header. This can include headers that can be documented in RFC 2822 and have a well defined meaning but are considered a string of characters. Within this category there can be two subgroups—some of these headers support characters from other cultures and languages while the other subgroup can be restricted to US-ASCII.

The second category can be a RFC defined complex header. These headers can be documented in RFC 2822, and can have well defined meanings. Additionally, these headers can include a string of US-ASCII characters and a potential list of parameter key/value pairs.

The third category can be a custom/user extension header. This category includes those headers that do not fall into the two other categories and include a string of US-ASCII characters. It is to be noted that binary content can be made to look like US-ASCII data by applying a base64 encoding to it.

The hierarchical model generator 602 (e.g., API) can provide objects to represent all of these headers, although some of these headers are highly specialized to one specific header type. The following chart provides further examples related to these headers.

| Class Name | Attributes | Type | Example |
| --- | --- | --- | --- |
| Header | Abstract | Base class for all headers | |
| AsciiTextHeader | Derived from Header. | RFC defined US-ASCII only headers. | Mime-Version, Content-Language |
| | | Custom Headers | X-Label |
| TextHeader | Derived from Header | RFC defined any language headers | Subject |
| AddressHeader | Derived from Header | RFC defined Complex header | To, From, CC, BCC, Reply-To |
| DateHeader | Derived from Header | RFC defined Complex header | Date, Expiry. |
| ReceivedHeader | Derived from Header | RFC defined Complex header | Received |
| ComplexHeader | Derived from Header | RFC defined Complex header that support parameters | |
| ContentDispositionHeader | Derived from ComplexHeader | RFC defined Complex headers | Content-Disposition |
| ContentTypeHeader | Derived from ComplexHeader | RFC defined Complex headers | Content-Type |

Figure 11:
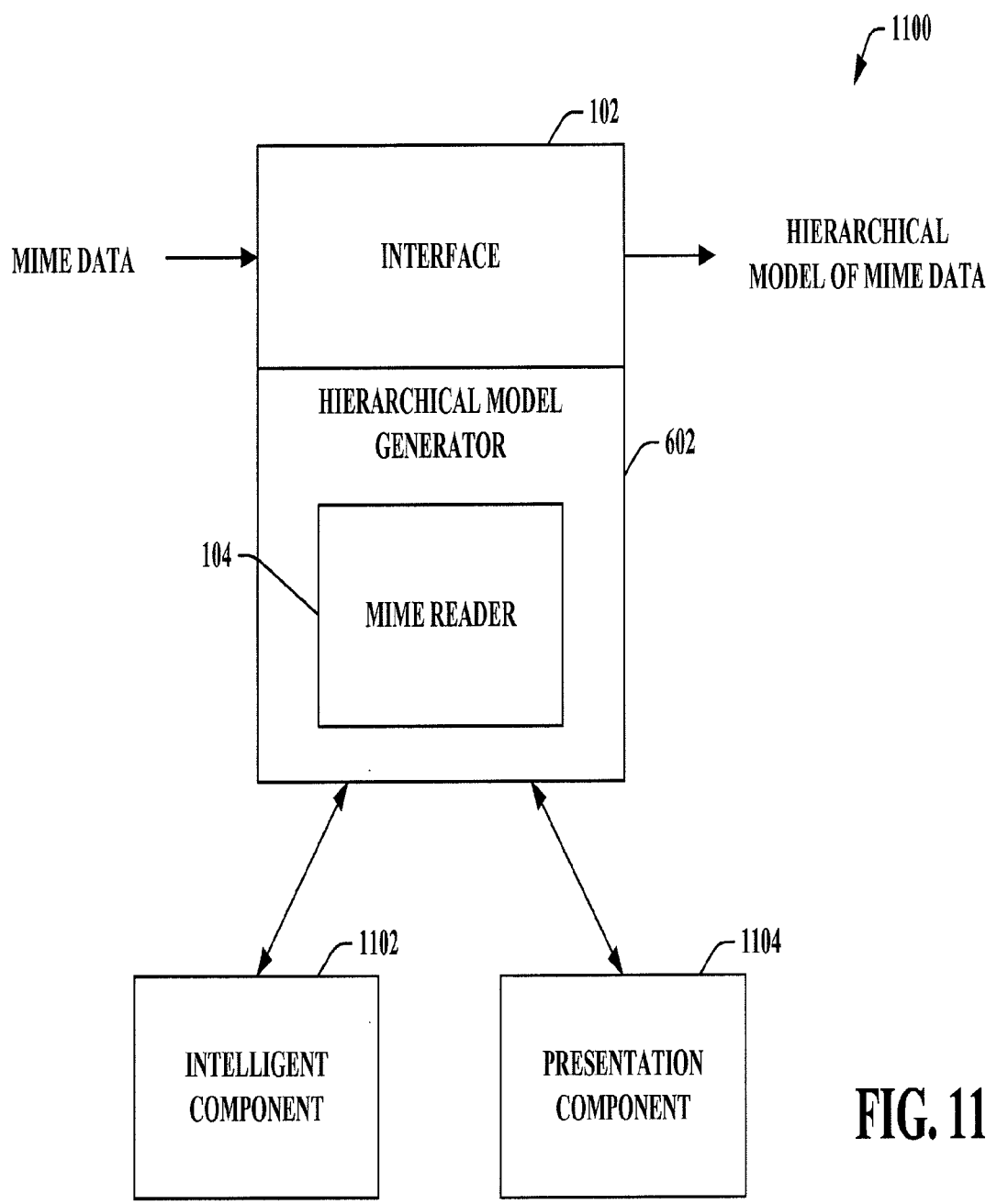
FIG. 11 illustrates a block diagram of an exemplary system that facilitates interpreting, manipulating, and/or authoring MIME data.

Turning to FIG. 11, illustrated is a system 1100 that facilitates interpreting, manipulating, and/or authoring MIME data. The system 1100 can include the interface 102 and the hierarchical model generator 602, which can further include the MIME reader 104, all of which can be substantially similar to respective components described above. The system 1100 further includes an intelligent component 1102. The intelligent component 1102 can be utilized by the hierarchical model generator 602 to facilitate generating the hierarchical model of the MIME data. By way of example, the intelligent component 1102 can enable recognizing and/or correcting MIME data that is analyzed by the MIME reader 104. Pursuant to a further illustration, the intelligent component 1102 can facilitate parsing MIME data (e.g., with the MIME reader 104) and/or assembling a document object model based upon the MIME data by evaluating structural aspects associated with the MIME data.

It is to be understood that the intelligent component 1102 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 1104 can provide various types of user interfaces to facilitate interaction between a user and any component coupled to the hierarchical model generator 602. As depicted, the presentation component 1104 is a separate entity that can be utilized with the hierarchical model generator 602. However, it is to be appreciated that the presentation component 1104 and/or similar view components can be incorporated into the hierarchical model generator 602 and/or a stand-alone unit. The presentation component 1104 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the hierarchical model generator 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 12:
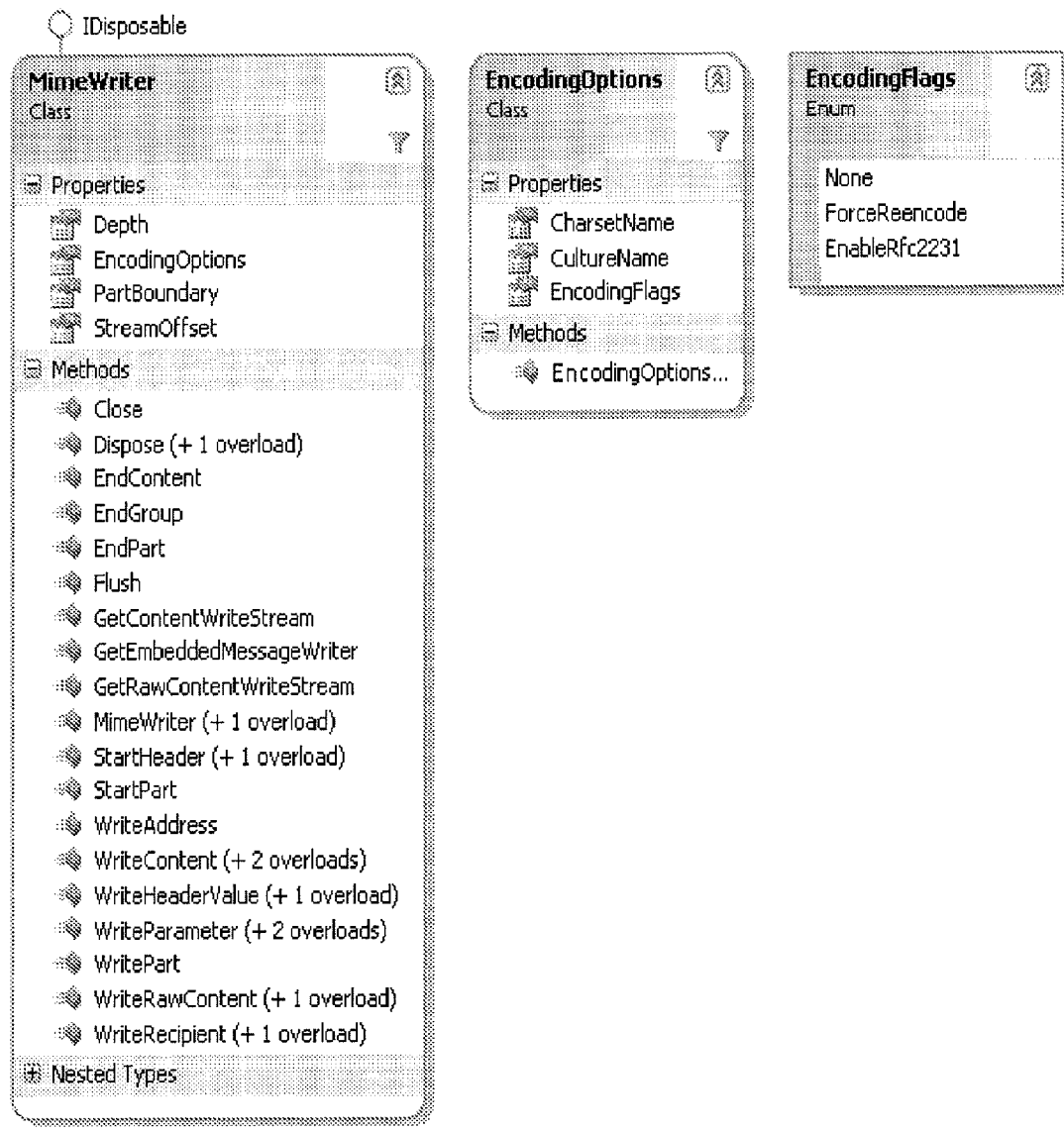
FIGS. 12-15 illustrate exemplary class diagrams in accordance with various aspects described herein.
Figure 13:
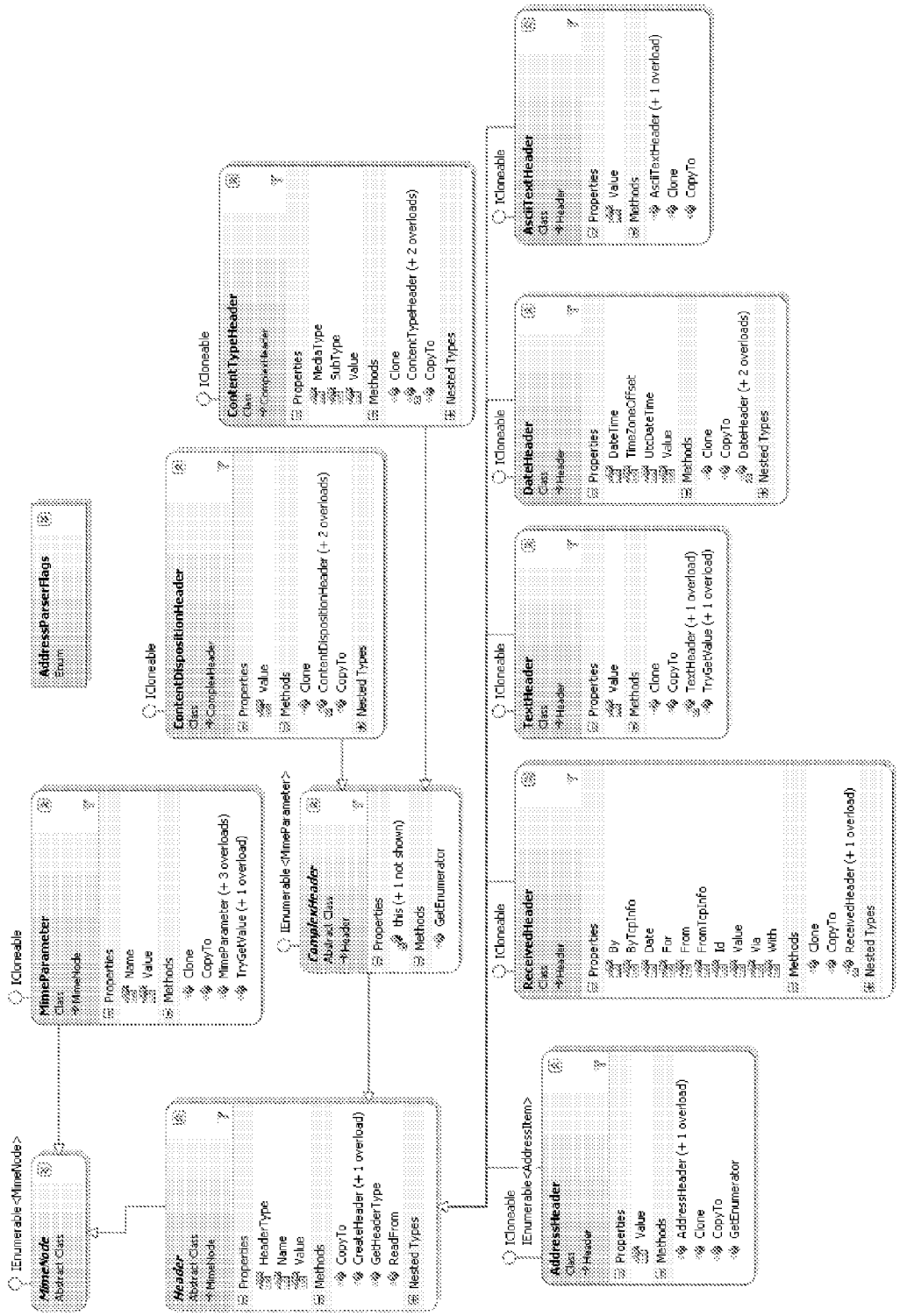
Figure 14:
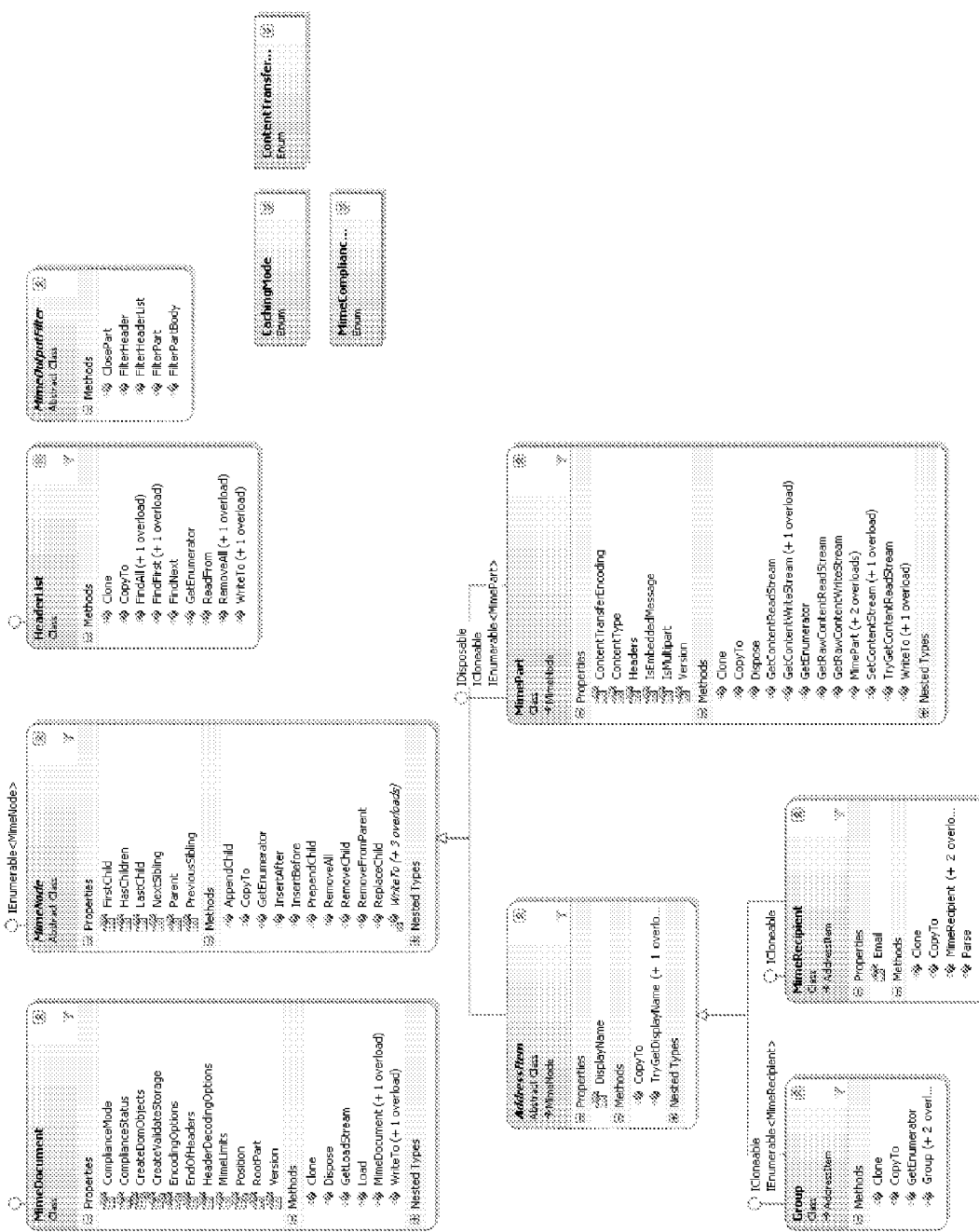
Figure 15:
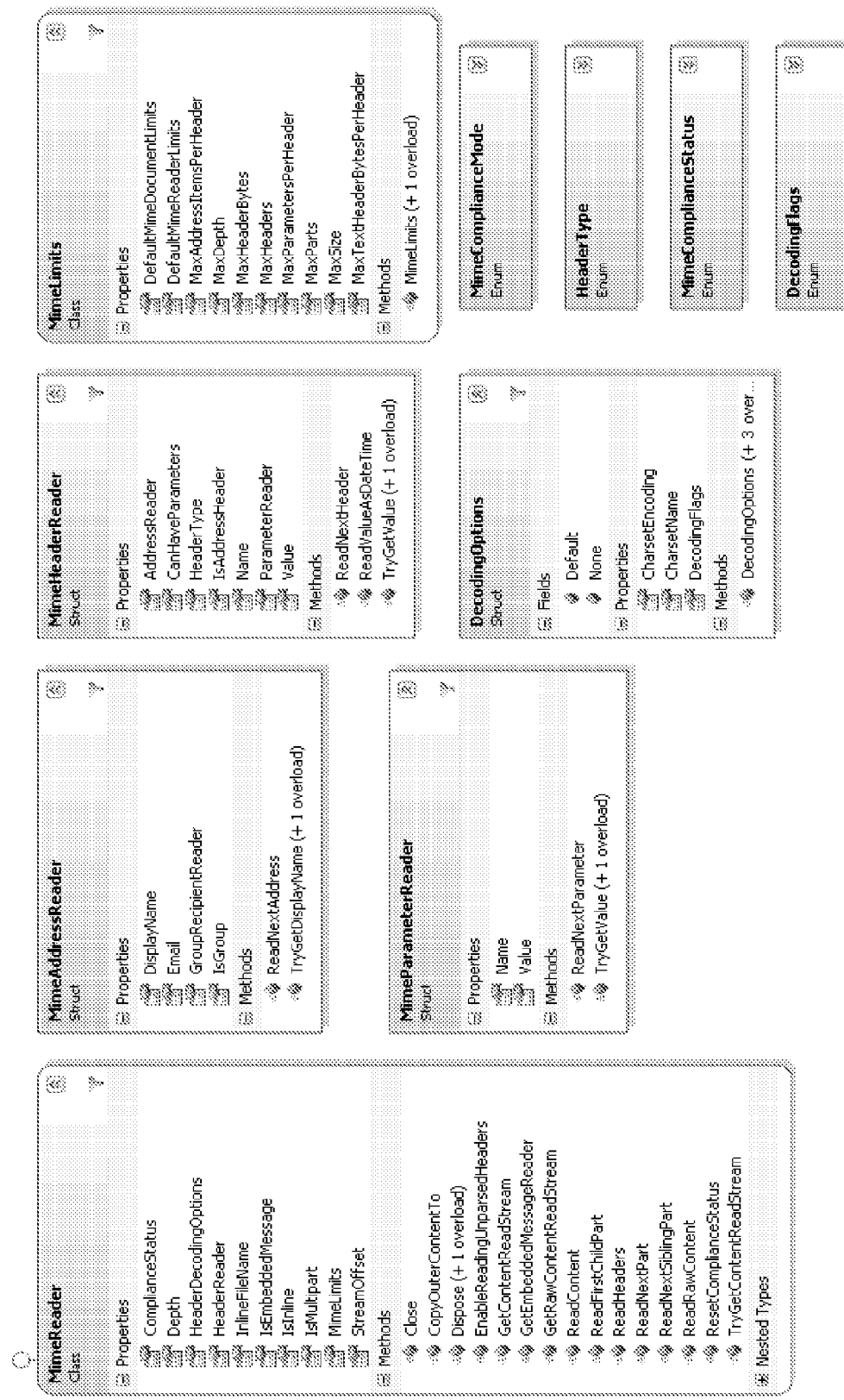

With reference to FIGS. 12-15, illustrated are exemplary class diagrams in accordance with various aspects described herein. It is to be appreciated that these examples are provided for illustration purposes and the claimed subject matter is not so limited. FIG. 12 illustrates exemplary classes related to a MIME writer. FIG. 13 depicts exemplary classes associated with headers. Referring to FIG. 14, illustrated is an exemplary hierarchical representation of classes related to a MIME document. Additionally, FIG. 15 shows exemplary classes pertaining to a MIME reader.

Figure 16:
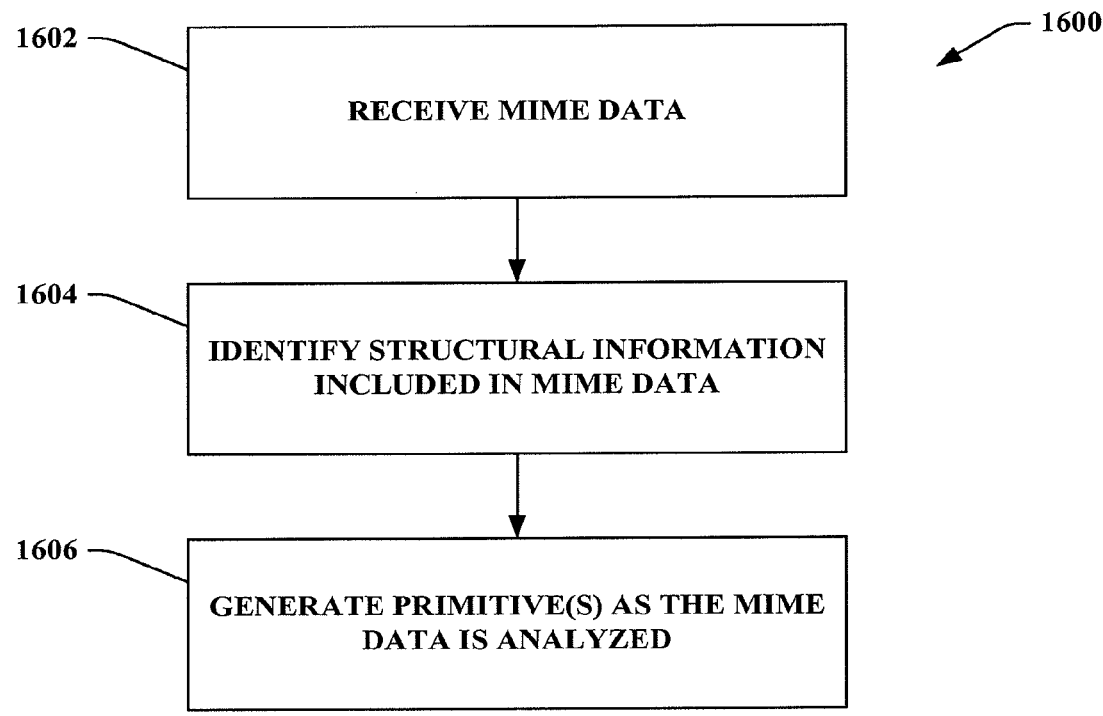
FIG. 16 illustrates an exemplary methodology that facilitates interpreting Multipurpose Internet Mail Extensions (MIME) data.
Figure 17:
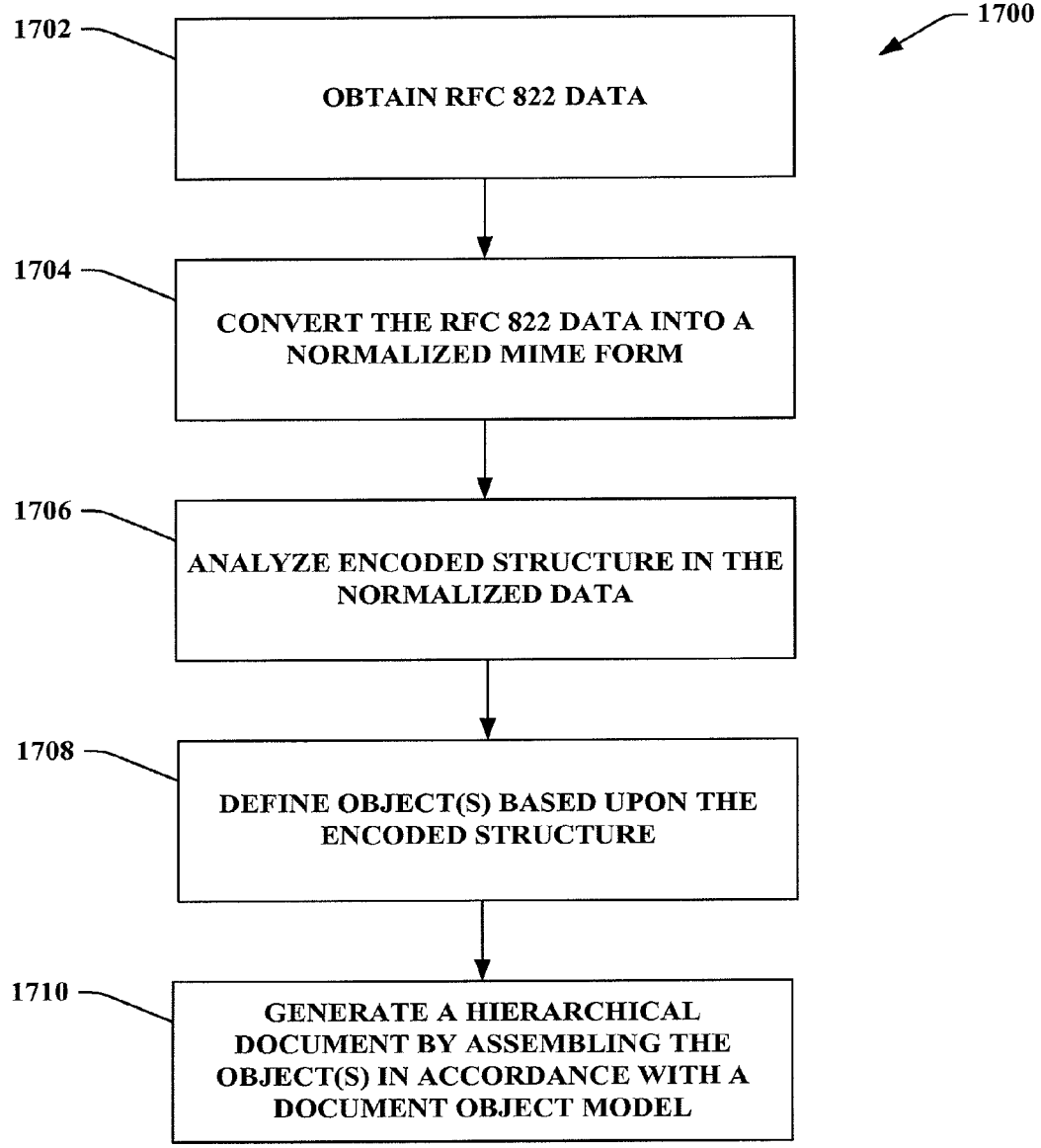
FIG. 17 illustrates an exemplary methodology that facilitates normalizing RFC 822 data and/or generating a hierarchical document based upon a document object model.

FIGS. 16-17 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies can alternatively be represented as a series of interrelated states via a state diagram or events.

With reference to FIG. 16, illustrated is a methodology 1600 that facilitates interpreting Multipurpose Internet Mail Extensions (MIME) data. At 1602, MIME data can be received. For instance, a stream of MIME data can be obtained. Additionally or alternatively, MIME data can be received via loading a static file that includes the MIME data. At 1604, structural information encoded within the obtained MIME data can be identified. By way of example, the structural information can be related to a header, a body, an attachment, and the like. At 1606, primitive(s) corresponding to the MIME data can be generated based on the identified encoded structural information. It is to be appreciated that additional functionality can be built upon the primitive(s) that are generated. For instance, a hierarchical model (e.g., document object model) can be produced. Additionally, the output format of a MIME document object model (DOM) can be customized as it is written out (e.g., via utilizing a serialization filter). Conventionally, the message can be serialized in a format that it came in with—the MIME format. However, the customization via the filter can provide the ability to plug in to the serialization process and make it produce any format (e.g., XML, IMAP, . . . ).

With reference to FIG. 17, illustrated is a methodology 1700 that facilitates normalizing RFC 822 data and/or generating a hierarchical document based upon a document object model. At 1702, RFC 822 data can be obtained. The RFC 822 data can be, for instance, associated with a format that differs from a MIME form; however, the claimed subject matter is not so limited. At 1704, the RFC 822 data can be converted into a normalized MIME form. By way of example, the obtained RFC 822 data can be modified by altering an associated structure, syntax, content, and so on.

At 1706, an encoded structure in the normalized data can be analyzed. For example, the normalized data can be parsed (e.g., utilizing structural aspects related to headers, parts, sub-parts, . . . ). At 1708, object(s) can be defined based upon the encoded structure. For instance, the object(s) can be related to various headers, parts, sub-parts, etc. Additionally, at 1710, a hierarchical document can be generated by assembling the object(s) in accordance with a document object model. The document object model can be an API that provides a logical structure of the hierarchical document and/or a manner in which the hierarchical document can be accessed and/or manipulated. For instance, the hierarchical document can have a tree structure and the document object model can provide for a manner by which the generated document can be navigated (e.g., by traversing from node to node within the document, . . . ). Moreover, the object(s) within the document can be accessed and/or manipulated (e.g., by way of adding, removing, modifying, etc. any of the object(s), . . . ) in accordance with the document object model.

Figure 18:
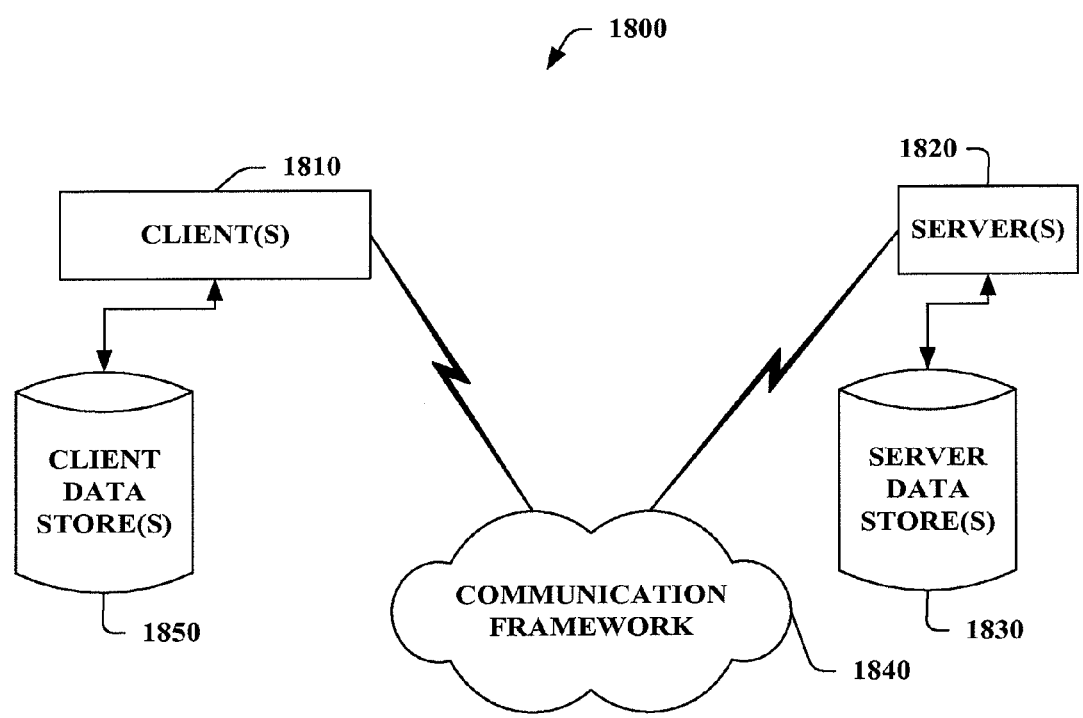
FIG. 18 illustrates an exemplary networking environment, wherein the novel aspects of the claimed subject matter can be employed.
Figure 19:
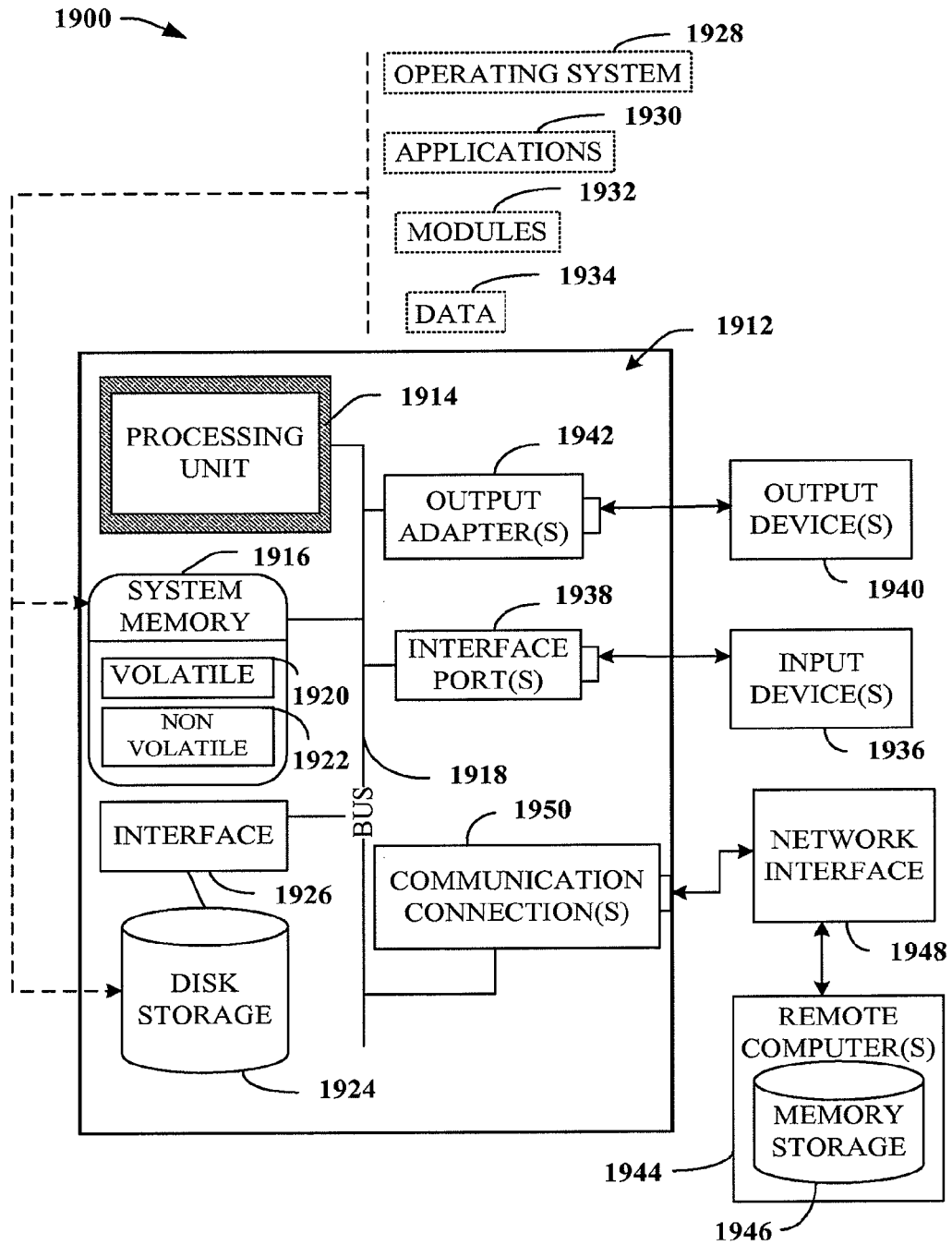
FIG. 19 illustrates an exemplary operating environment that can be employed in accordance with the claimed subject matter.

In order to provide additional context for implementing various aspects of the claimed subject matter, FIGS. 18-19 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 18 is a schematic block diagram of a sample-computing environment 1800 with which the claimed subject matter can interact. The system 1800 includes one or more client(s) 1810. The client(s) 1810 can be hardware and/or software (e.g., threads, processes, computing devices). The system 1800 also includes one or more server(s) 1820. The server(s) 1820 can be hardware and/or software (e.g., threads, processes, computing devices). The servers 1820 can house threads to perform transformations by employing the subject innovation, for example.

One possible communication between a client 1810 and a server 1820 can be in the form of a data packet adapted to be transmitted between two or more computer processes. The system 1800 includes a communication framework 1840 that can be employed to facilitate communications between the client(s) 1810 and the server(s) 1820. The client(s) 1810 are operably connected to one or more client data store(s) 1850 that can be employed to store information local to the client(s) 1810.

Similarly, the server(s) 1820 are operably connected to one or more server data store(s) 1830 that can be employed to store information local to the servers 1820.

With reference to FIG. 19, an exemplary environment 1900 for implementing various aspects of the claimed subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), or flash memory. Volatile memory 1920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1924 to the system bus 1918, a removable or non-removable interface is typically used such as interface 1926.

It is to be appreciated that FIG. 19 describes software that acts as an intermediary between users and the basic computer resources described in the suitable operating environment 1900. Such software includes an operating system 1928. Operating system 1928, which can be stored on disk storage 1924, acts to control and allocate resources of the computer system 1912. System applications 1930 take advantage of the management of resources by operating system 1928 through program modules 1932 and program data 1934 stored either in system memory 1916 or on disk storage 1924. It is to be appreciated that the claimed subject matter can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for converting data having a first format to data having a Multipurpose Internet Mail Extensions (MIME) format, the method comprising:
   receiving data in a first format;
   identifying structural information encoded within the data having the first format;
   analyzing the structural information encoded within the data having the first format to generate at least one primitive;
   generating data having a MIME format from the at least one primitive;
   identifying corrupted generated MIME data; and
   correcting the identified corrupted generated MIME data.

2. The method of claim 1, wherein the at least one primitive is used to generate a hierarchical model associated with the data having the MIME format.

3. The method of claim 2, further comprising receiving one or more changes to the hierarchical model; and
   in response to the one or more changes, altering the data having the MIME format.

4. The method of claim 1, wherein the data having the first format is RFC 822 data.

5. The method of claim 1, wherein the structural information encoded with the data having the first format comprises one or more of: a header, a body, a start of a child message, a subject, and an attachment.

6. The method of claim 1, wherein the data having the first format comprises a stream of RFC 822 data.

7. The method of claim 1, wherein identifying structural information encoded within the data having the first format comprises identifying a hierarchical structure associated with the data having the first format.

8. A computer-readable storage device encoding computer executable instructions which, when executed by at least one processor, performs a method for converting data having a first format to data having a Multipurpose Internet Mail Extensions (MIME) format, the method comprising:
   receiving data in a first format;
   identifying structural information encoded within the data having the first format;
   analyzing the structural information encoded within the data having the first format to generate at least one primitive; and
   generating data having a MIME format from the at least one primitive;
   identifying corrupted generated MIME data; and
   correcting the identified corrupted generated MIME data.

9. The computer-readable storage device of claim 8, wherein the at least one primitive is used to generate a hierarchical model associated with the data having the MIME format.

10. The computer-readable storage device of claim 9, further comprising instructions for receiving one or more changes to the hierarchical model; and
    in response to the one or more changes, altering the data having the MIME format.

11. The computer-readable storage device of claim 8, wherein the data having the first format is RFC 822 data.

12. The computer-readable storage device of claim 8, wherein the structural information encoded with the data having the first format comprises one or more of: a header, a body, a start of a child message, a subject, and an attachment.

13. The computer-readable storage device of claim 8, wherein the data having the first format comprises a stream of RFC 822 data.

14. The computer-readable storage device of claim 8, wherein identifying structural information encoded within the data having the first format comprises identifying a hierarchical structure associated with the data having the first format.

15. A method for converting data having a Multipurpose Internet Mail Extensions (MIME) format to a having a second format, the method comprising:
    receiving data in a MIME format;
    identifying structural information encoded within the data having the MIME format, wherein identifying structural information includes identifying corrupted data having the MIME format and correcting the identified corrupted data;
    analyzing the structural information encoded within the data having the MIME format to generate at least one primitive; and
    generating data having a second format from the at least one primitive.

16. The method of claim 15, wherein the at least one primitive is generated from a hierarchical model associated with the data having the second format.

17. The method of claim 16, further comprising:
- receiving one or more changes to the hierarchical model; and
- in response to the one or more changes, altering the data having the MIME format.

18. The method of claim 15, wherein the data having the second format is RFC 822 data.

19. The method of claim 15, wherein the structural information encoded with the data having the MIME format comprises one or more of: a header, a body, a start of a child message, a subject, and an attachment.

20. The method of claim 15, wherein identifying structural information encoded within the data having the MIME format comprises identifying a hierarchical structure associated with the data having the MIME format.

\* \* \* \* \*